United States Patent
Oyama

(10) Patent No.: US 10,395,622 B2
(45) Date of Patent: Aug. 27, 2019

(54) INFORMATION PROCESSING APPARATUS, METHOD AND NON-TRANSITORY COMPUTOR READABLE STORAGE MEDIUM FOR DISPLAYING IMAGES ARRANGED IN A MATRIX PATTERN ON SCREEN

(71) Applicant: CANON KABUSHIKI KAISHA, Tokyo (JP)

(72) Inventor: Yasufumi Oyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/440,974

(22) Filed: Feb. 23, 2017

(65) Prior Publication Data

US 2017/0162175 A1    Jun. 8, 2017

Related U.S. Application Data

(63) Continuation of application No. 13/019,914, filed on Feb. 2, 2011, now Pat. No. 9,620,076.

(30) Foreign Application Priority Data

Feb. 4, 2010    (JP) ................................ 2010-023201

(51) Int. Cl.
*G09G 5/34*    (2006.01)
*G09G 5/00*    (2006.01)
(Continued)

(52) U.S. Cl.
CPC ................ *G09G 5/34* (2013.01); *G09G 5/00* (2013.01); *G09G 5/373* (2013.01); *G06F 3/0485* (2013.01);
(Continued)

(58) Field of Classification Search
None
See application file for complete search history.

(56) References Cited

U.S. PATENT DOCUMENTS

| 2008/0174597 | A1* | 7/2008 | Takagi | G06F 3/0482 |
| | | | | 345/418 |
| 2008/0308732 | A1* | 12/2008 | Warnke | G01N 25/72 |
| | | | | 250/330 |
| 2009/0187857 | A1* | 7/2009 | Tanaka | G06F 3/0481 |
| | | | | 715/811 |

FOREIGN PATENT DOCUMENTS

| JP | 06-110998 A | 4/1994 |
| JP | 2000-125251 A | 4/2000 |
| JP | 2001-231005 A | 8/2001 |

OTHER PUBLICATIONS

"Delay Loading of Images" http://www.websitemagazine.com/content/blogs/posts/archive/2009/10/23/delay-loading-of-images-in-long-pages.aspx. Archived on Oct. 26, 2009. Retrieved on Jan. 28, 2015 from https://web.archive.org/web/20091026142015/http://www.websitemagazine.com/content/blogs/posts/archive/2009/10/23/delay-loading-of-images-in-long-pages.aspx.*

* cited by examiner

*Primary Examiner* — Zhengxi Liu
(74) *Attorney, Agent, or Firm* — Canon U.S.A., Inc. IP Division

(57) ABSTRACT

An apparatus capable of displaying a plurality of images while a screen is scrolled, including a processing unit configured to process an image to be displayed on a display unit, a display control unit configured to control the display unit to display a plurality of images processed by the processing unit, a scroll control unit configured to set another plurality of images as display targets to be displayed on the display unit by scrolling the displayed plurality of images, and a control unit configured to control the process- (Continued)

ing unit to process the plurality of images as the display targets such as to prioritize the processing for an image disposed on an upstream side over an image disposed on a downstream side in a moving direction of scrolled images.

48 Claims, 14 Drawing Sheets

(51) Int. Cl.
*G09G 5/373* (2006.01)
*G06F 3/0485* (2013.01)
(52) U.S. Cl.
CPC . *G09G 2340/04* (2013.01); *G09G 2340/0464* (2013.01); *G09G 2354/00* (2013.01); *G09G 2360/18* (2013.01)

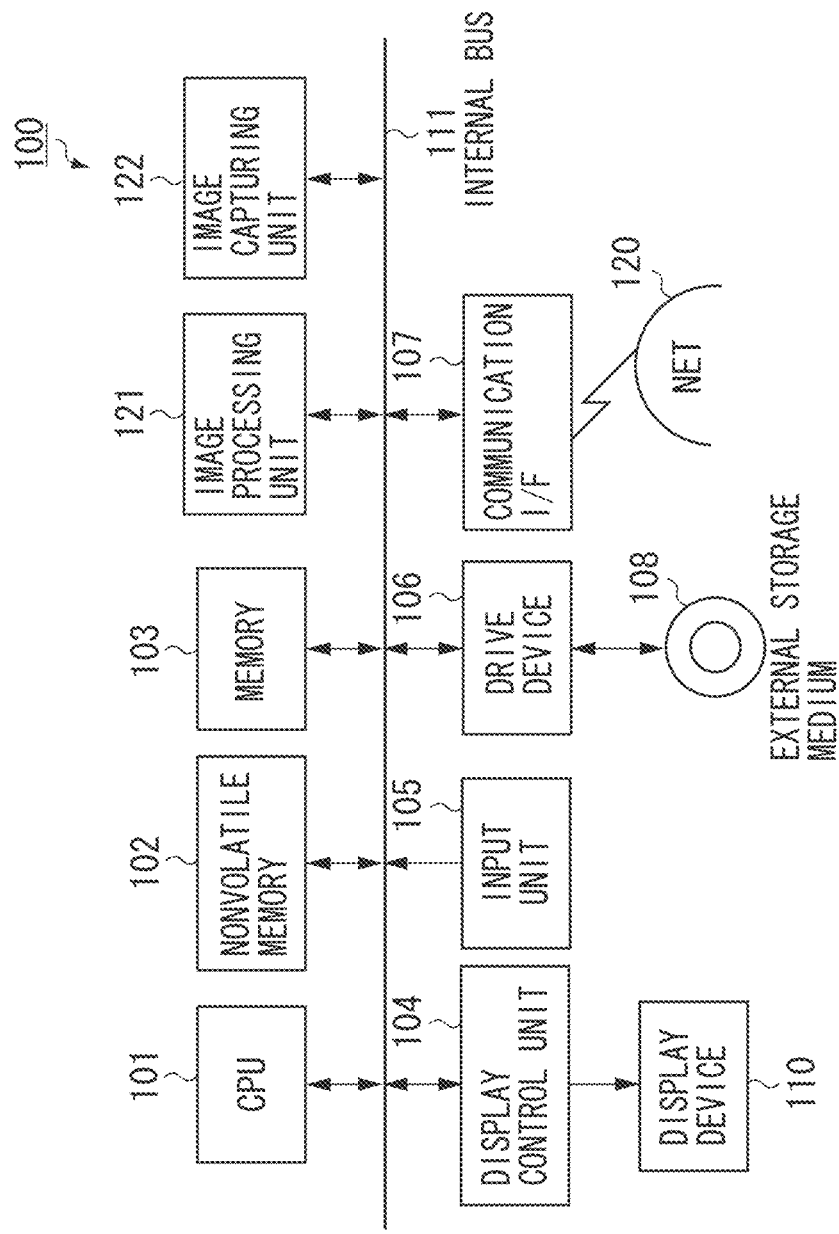

FIG. 2A

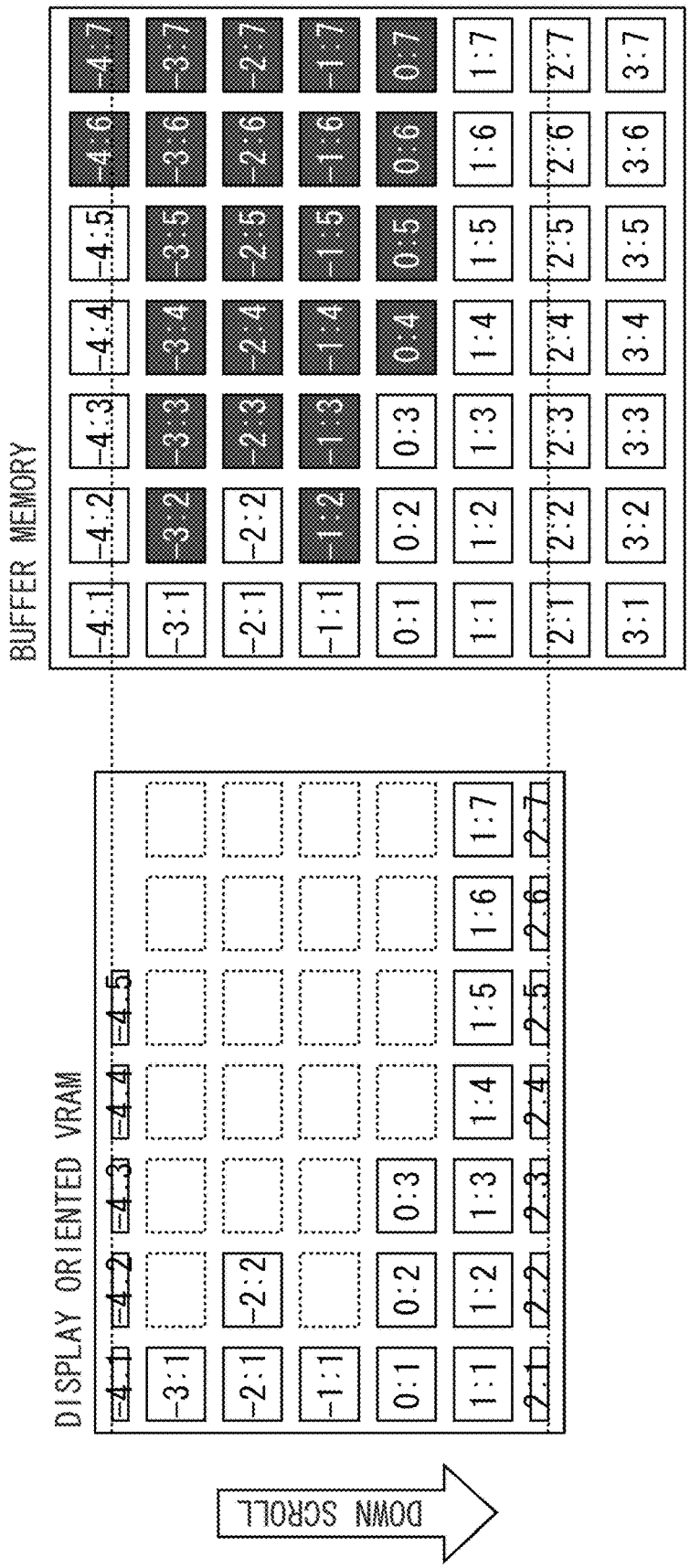

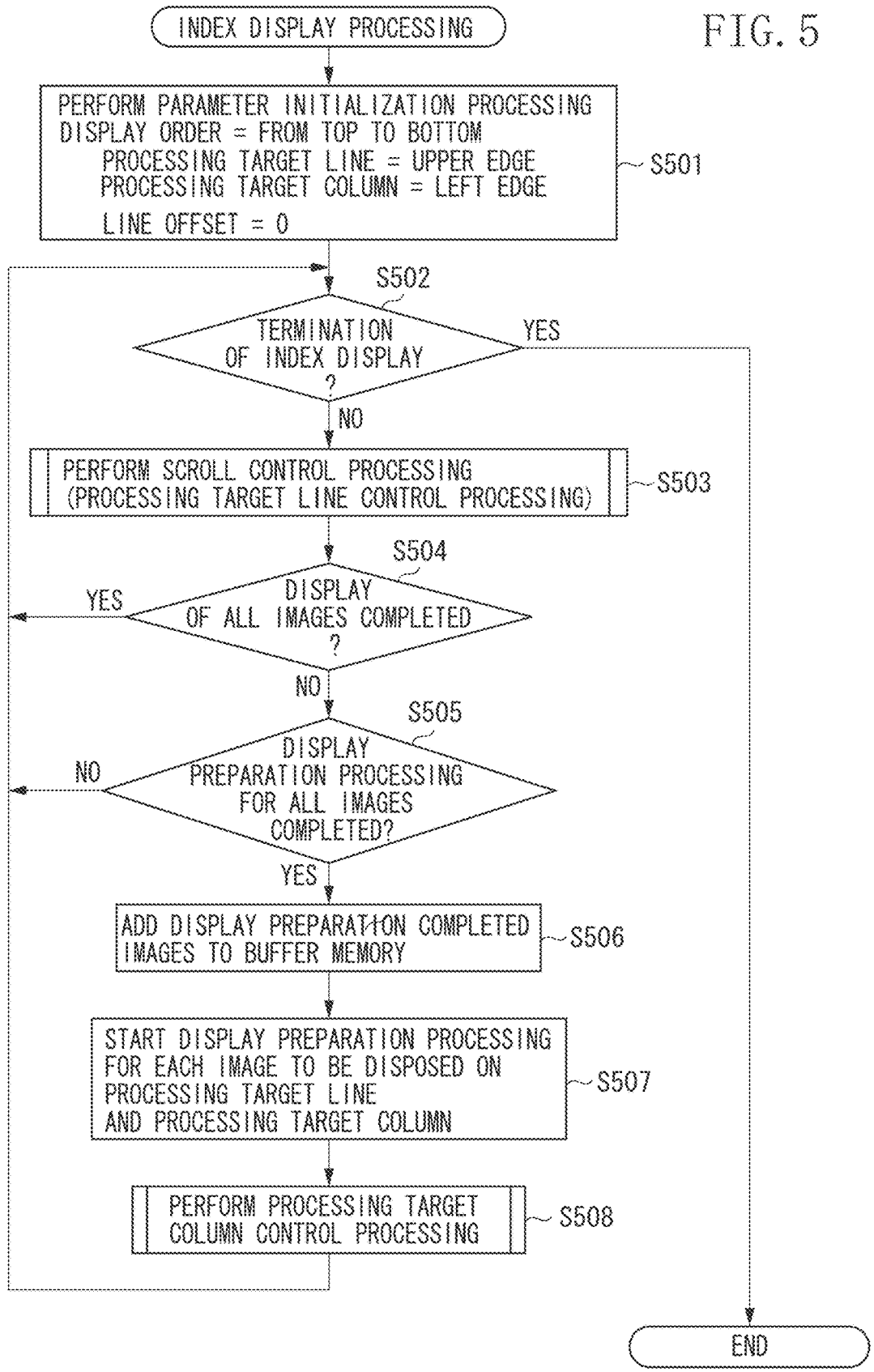

INFORMATION PROCESSING APPARATUS, METHOD AND NON-TRANSITORY COMPUTOR READABLE STORAGE MEDIUM FOR DISPLAYING IMAGES ARRANGED IN A MATRIX PATTERN ON SCREEN

CROSS-REFERENCE TO RELATED APPLICATION

This application is a Continuation of U.S. application Ser. No. 13/019,914, filed Feb. 2, 2011, which claims priority from Japanese Patent Application No. 2010-023201, filed Feb. 4, 2010 which are hereby incorporated by reference herein in their entireties.

BACKGROUND OF THE INVENTION

Field of the Invention

The present invention relates to a display control apparatus capable of displaying a plurality of images and a method for controlling the display control apparatus.

Description of the Related Art

There is a conventional digital device that can simultaneously display a plurality of images (e.g., photographs) on the same screen (i.e., an index display screen).

An advanced display device, which is large in screen size and excellent in accuracy, is usable for the above-described index display. Further, the processing ability of a recently available control device and the storage capacity of a storage medium are sufficiently high to simultaneously display many images on the same screen.

In general, a digital device realizing the index display enables users to scroll a plurality of images on a display screen in an arbitrary direction by operating an operation member (e.g., a button, a lever, a rotary dial, or a touch panel).

On the other hand, to display a plurality of images, a significant physical processing time is used to perform processing for reading image data from a storage medium, decoding image data (including decompressing compressed image data), resizing image data according to a display size, and rasterizing image data into a video random access memory (VRAM).

When the index display is performed to simultaneously display a plurality of images, the digital device is used to repetitively perform the above-described sequential processing for each of the plurality of images. Therefore, it takes a relatively long time to complete display preparation processing for all images to be displayed on the same screen.

Hence, a conventional method discussed in Japanese Patent Application Laid-Open No. 2001-231005 includes changing a display order of each image to be displayed on an index display screen according to predetermined conditions, initially displaying the images that have been previously browsed by a user, and prioritizing the display of an image positioned closely to the previously displayed images.

According to the above-described conventional method, the user can surely find the images having been previously browsed immediately after the index display is started.

However, according to the above-described conventional method, if the scrolling is performed on the index display screen, the display of images to be newly displayed according to the scrolling may be delayed because a relatively longtime is used to complete the display preparation processing for newly displayed images.

The delay time tends to increase in proportion to the scrolling speed and also increase in proportion to the number of images to be displayed simultaneously. In an extreme case, no image can be newly displayed when the scrolling speed is high.

If the display of the images to be displayed is delayed too much, a user who is performing a scroll operation cannot check an actual state of the scrolling currently in progress and therefore cannot determine the time to stop the scrolling.

Further, even after a user inputs an instruction to stop the scrolling, there is a relatively long waiting time to complete the display processing for the images being not yet displayed.

When the scrolling is performed on an index display screen according to the method discussed in Japanese Patent Application Laid-Open No. 2001-231005, the display of an image positioned closely to the previously displayed images, i.e., an image positioned on an immediately disappearing side with respect to the scrolling direction (which corresponds to a moving direction of the images), is prioritized.

However, the image positioned closely to the previously displayed images is shortly excluded from a display target group, while the scrolling advances, at earlier timing compared to other images newly added to the display target group.

Therefore, the possibility of completing the display preparation processing for the image positioned closely to the previously displayed images before the image is excluded from the display target group is relatively low.

Moreover, the display preparation processing for other images newly added to the display target group is delayed correspondingly because the processing priority order for these newly added images is lower than that of the image positioned closely to the previously displayed images.

Therefore, according to the method discussed in Japanese Patent Application Laid-Open No. 2001-231005, the display preparation processing may be entirely delayed and many of the images to be displayed may not be actually displayed on the index display screen during the scroll operation.

SUMMARY OF THE INVENTION

According to an aspect of the present invention, an apparatus includes a processing unit configured to process an image to be displayed on a display unit, a display control unit configured to control a display unit to display a plurality of images processed by the processing unit, a scroll control unit configured to set another plurality of images as display targets to be displayed on the display unit by scrolling the displayed plurality of images, and a control unit configured to control the processing unit to process the plurality of images as the display targets such as to prioritize the processing for an image disposed on an upstream side over an image disposed on a downstream side in a moving direction of scrolled images.

Further features and aspects of the present invention will become apparent from the following detailed description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1A is a block diagram illustrating a hardware configuration of a digital camera according to an exemplary embodiment of the present invention.

FIGS. 2A to 2C schematically illustrate a relationship between a display oriented VRAM and a buffer memory when the scrolling is performed on an index display screen.

FIG. 4 schematically illustrate a relationship between the display oriented VRAM and the buffer memory when the scrolling is performed in the opposite direction on the index display screen.

FIG. 5 is a flowchart illustrating the index display processing according to an exemplary embodiment of the present invention.

DESCRIPTION OF THE EMBODIMENTS

Various exemplary embodiments, features, and aspects of the invention will be described in detail below with reference to the drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Figure 1B:
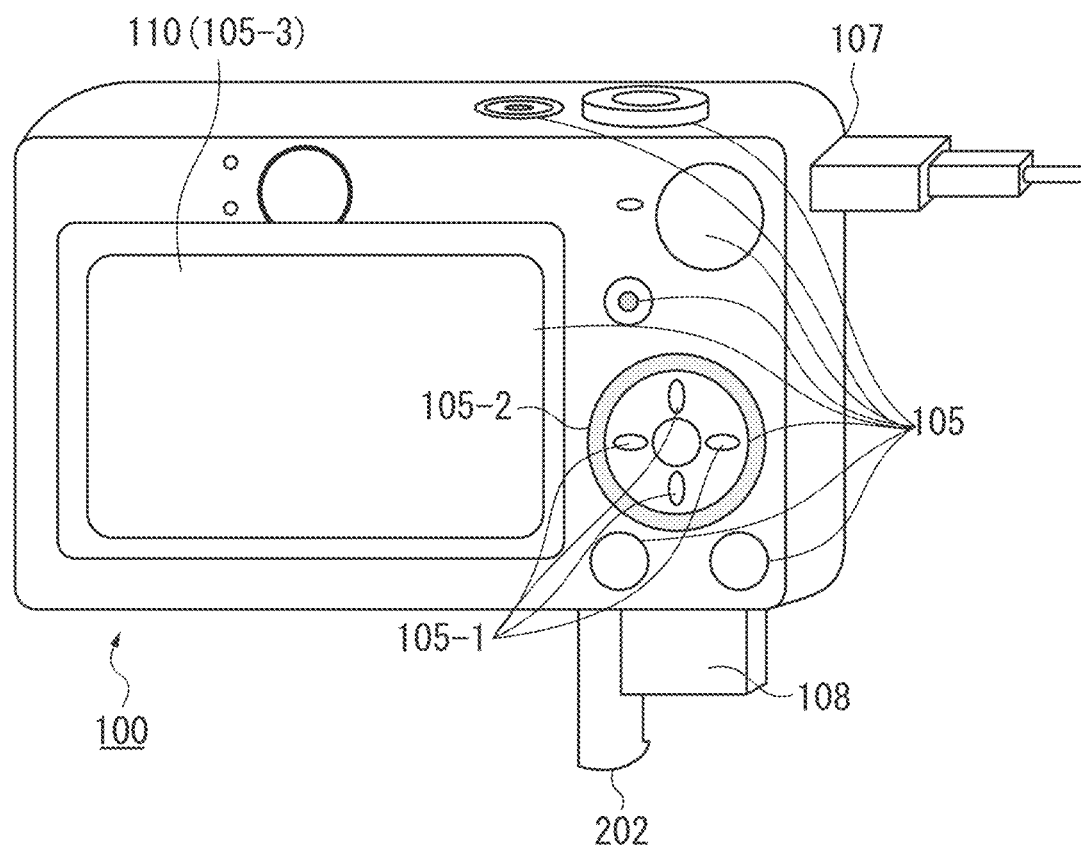
FIG. 1B is a perspective view illustrating aback face of the digital camera according to an exemplary embodiment of the present invention.

FIGS. 1A and 1B illustrate a digital camera 100 as an example of a display control apparatus, to which each exemplary embodiment of the present invention is applicable. FIG. 1A is a block diagram illustrating an example configuration of the digital camera 100. FIG. 1B illustrates an appearance of the digital camera 100.

In FIG. 1, a central processing unit (CPU) 101, a nonvolatile memory 102, a memory 103, a display control unit 104, an input unit 105, a drive device 106, a communication interface (I/F) 107, an image processing unit 121, and an image capturing unit 122 are connected to an internal bus 111. The above-described components connected to the internal bus 111 can mutually transmit and receive data or information via the internal bus 111.

The nonvolatile memory 102 stores various setting values and programs that are used when the CPU 101 performs various operations. The memory 103 is, for example, a random access memory (RAM). The CPU 101 controls various components constituting the digital camera 100 according to a control program, for example, stored in the nonvolatile memory 102. The CPU 101 can use the memory 103 as a work memory.

The input unit 105 is functionally operable to accept a user's operation, generate a control signal corresponding to the user's operation, and supply the control signal to the CPU 101. The input unit 105 includes, as an operation member that enables users to operate, buttons (including a direction button 105-1 disposed in a cross shape), a rotary wheel 105-2, and a touch panel 105-3 serving as a pointing device.

The touch panel 105-3 is, for example, an input device configured to detect a finger position on a flat panel and outputs coordinate information representing the detected position. The pointing device is not limited to the touch panel and can be replaced with a mouse or a trackball.

The CPU 101 is functionally operable to control constituent components of the digital camera 100 according to a control program based on a signal supplied from the input unit 105 in response to a user's operation input via the input device. Thus, the digital camera 100 can perform a predetermined operation according to each user's operation.

In a case where the input unit 105 is a touch panel, the input unit 105 and the display device 110 can be integrated together. For example, it is desired that the transmissivity of the light does not interfere with the display of the display device 110 in a state where the touch panel is attached to an upper layer of a display surface of the display device 110.

Further, it is desired to correlate input coordinates of the touch panel with display coordinates of the display device 110. The input device constituted in the above-described manner is generally referred to as Graphical User Interface (GUI) that enables users to feel as if they can directly operate a screen displayed on the display device 110.

The display control unit 104 is functionally operable to output a display signal, which is used to display an image, to the display device 110. For example, the CPU 101 generates a display control signal according to a program and supplies the generated display control signal to the display control unit 104.

The display control unit 104 generates a display signal based on the display control signal and outputs the generated display signal to the display device 110.

For example, the display control unit 104 causes the display device 110 to display a GUI screen that configures the GUI based on the display control signal supplied from the CPU 101.

An external storage medium 108 (e.g., a memory card) is attachable to the drive device 106. The drive device 106 is functionally operable to read data from the external storage medium 108 according to a control signal supplied from the CPU 101. Further, the drive device 106 is functionally operable to write data to the external storage medium 108 according to a control signal supplied from the CPU 101.

The external storage medium 108 that can be inserted to the drive device 106 is not limited to a semiconductor memory, such as a memory card. For example, a disk storage medium, such as a compact disk (CD), a digital versatile disk (DVD), and a hard disk, can be also attached to the drive device 106.

The external storage medium 108 can be stored in a slot provided in a camera body, which is equipped with a lid 202. The communication I/F 107 is functionally operable to communicate with a network 120 (such as a local area network (LAN) or the Internet) based on a control signal supplied from the CPU 101. The communication I/F 107 illustrated in FIG. 1B is a wired type and can be replaced with a wireless type.

The image capturing unit 122 includes a photographing lens including a focus lens, a shutter having a diaphragm function, an image sensor (e.g., a Charge Coupled Device (CCD) sensor or a Complementary Metal Oxide Semiconductor (CMOS) sensor) capable of converting an optical image into an electric signal, and an A/D converter.

The image processing unit 121 is functionally operable to perform decoding, encoding, interpolation processing, resizing processing (e.g., enlargement and reduction), and color conversion processing on image data supplied from the image capturing unit 122 or image data read from the external storage medium 108.

An example operation according to the present exemplary embodiment is schematically described below with reference to FIGS. 2 to 4.

Example processing according to the present exemplary embodiment is prioritizing the display processing of images to be disposed far from the images having been displayed before scrolling, among images to be newly displayed, when the scrolling of a plurality of images is performed in the up-and-down direction in a state where an index display screen is displayed on the display device 110.

It is assumed that the index display according to the present exemplary embodiment is performed in such a way as to arrange a plurality of images in a matrix pattern.

Further, it is assumed that the positioning of images on the index display screen is performed in such a way as to dispose a plurality of images of a concerned line from the left edge to the right edge and then dispose a plurality of images of the next line from the left edge to the right edge according to a predetermined order, for example, in order of image file name, in order of image number, or in order of shooting date/time order.

In a case where the total number of images to be displayed exceeds the size of one screen, images to be disposed on a preceding line or a subsequent line can be displayed by performing the scrolling on the index display screen. In the present invention, the layout order (i.e., arranging order) of images may not coincide with temporal display order, as described below.

First, a display oriented VRAM (i.e., display oriented memory) and a buffer memory are described below in detail. The memory 103 includes a display oriented VRAM area and a buffer memory area.

In the processing for displaying images on the display device 110, the CPU 101 causes the drive device 106 to read image to be displayed from the external storage medium 108 or the like. The image processing unit 121 performs decoding processing on the read images and also performs decompression processing if the read images are compressed images.

The image processing unit 121 further performs processing for resizing the decoded images so as to fit to a display size and rasterizing (storing) the resized images in the buffer memory. In the present exemplary embodiment, at least a part of the above-described processing can be referred to as display preparation processing.

The CPU 101 causes the memory 103 to store, in the display oriented VRAM, a copy of display data corresponding to one screen including images to be displayed on the display device 110 among the images rasterized in the buffer memory.

The display data stored in the display oriented VRAM can be displayed on the display device 110 via the display control unit 104.

Figure 2A:
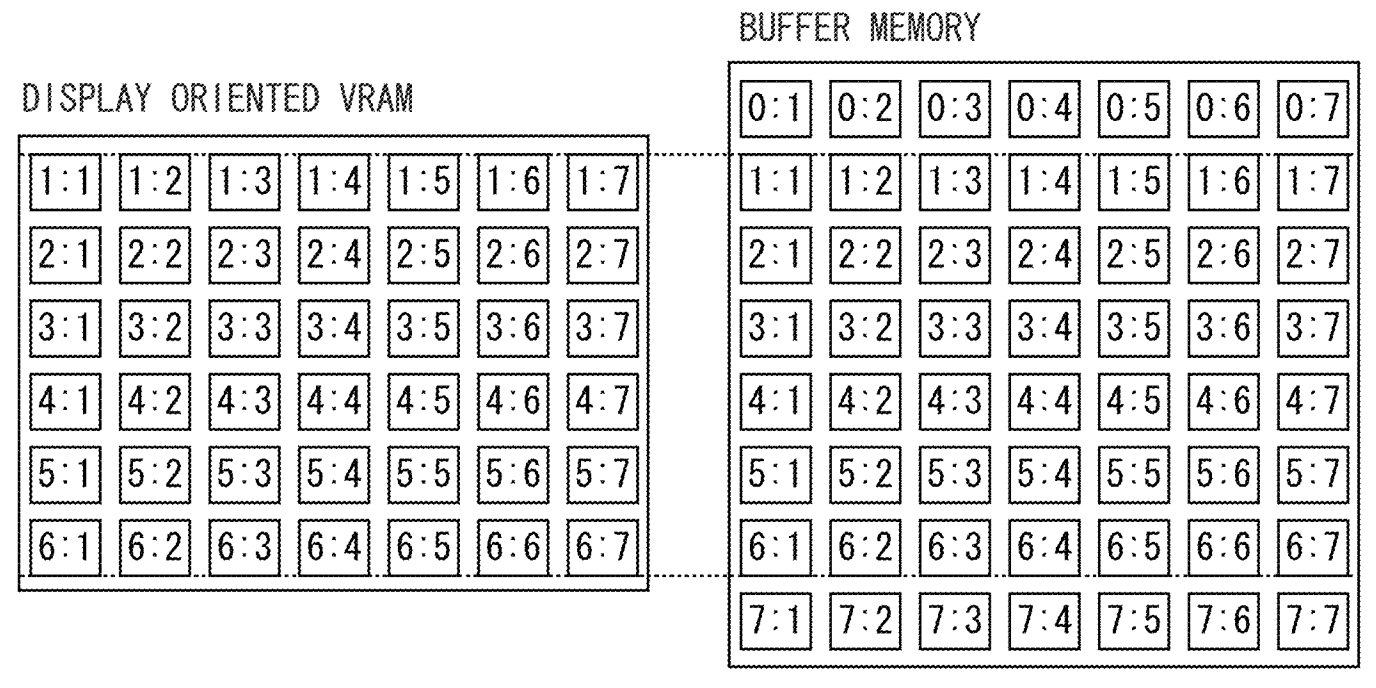
Figure 2B:
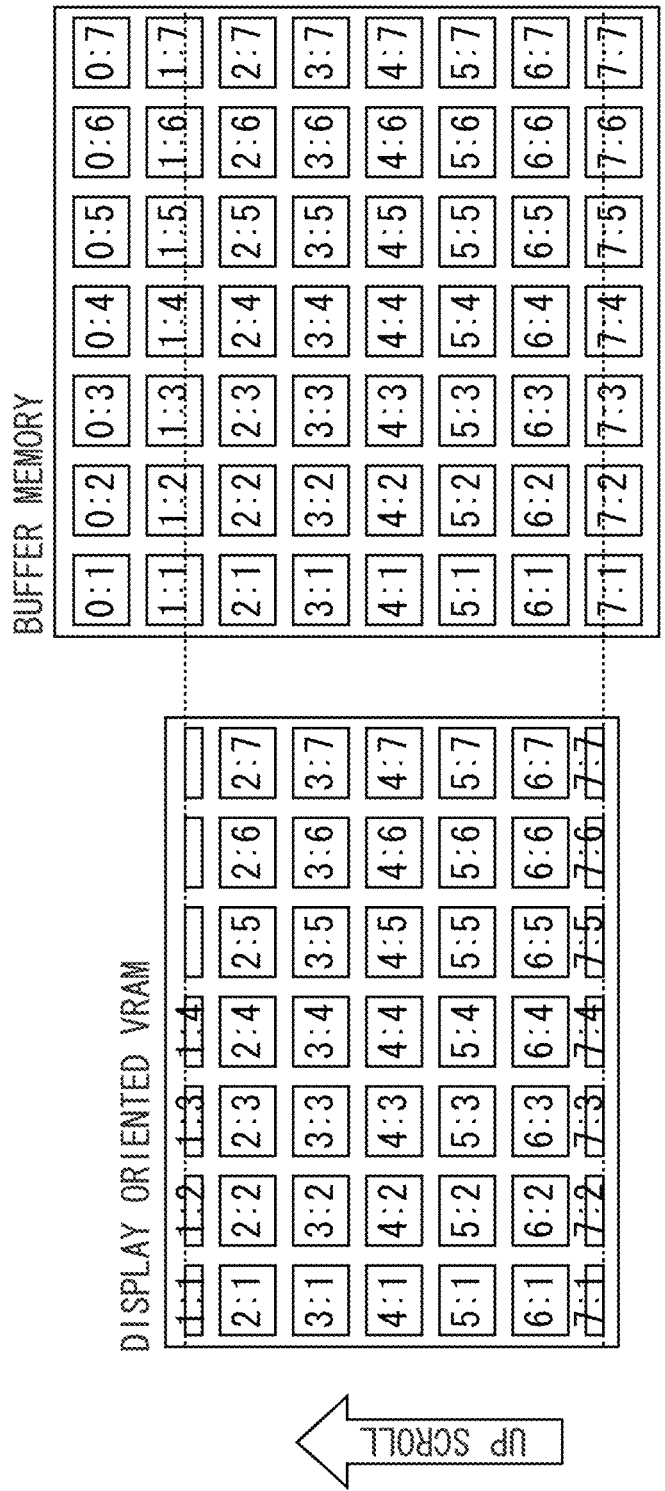
Figure 2C:
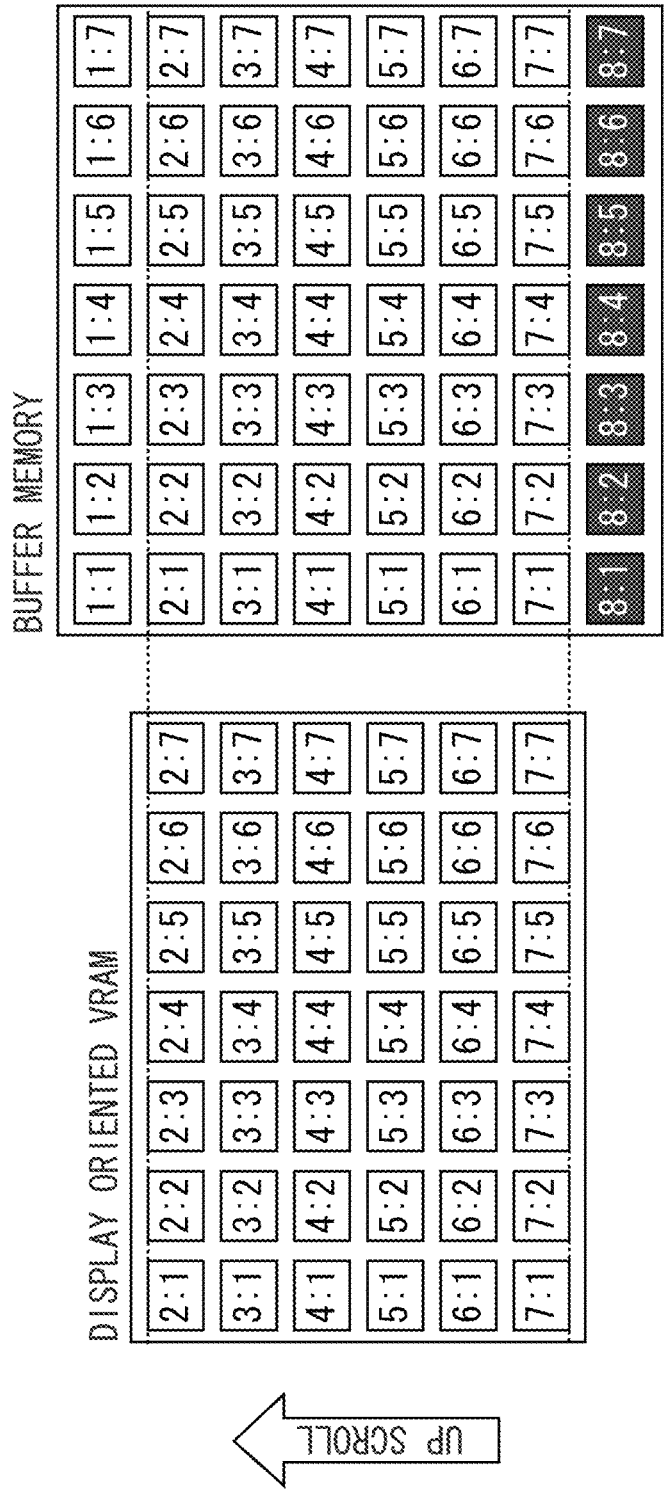

FIGS. 2A to 2C schematically illustrate a relationship between the display oriented VRAM and the buffer memory in a case where the scrolling is performed on the index display screen. FIG. 2A illustrates a stationary state of the display oriented VRAM and the buffer memory before the scrolling is performed on the index display screen.

It is assumed that the index display processing according to the present exemplary embodiment is performed so as to display a total of 42 images composed of six lines and seven columns in a matrix pattern on the index display screen.

In the following description, an image displayed at the position defined by a Y-th line and an X-th column is simply referred to as image Y:X.

In this case, as illustrated in FIG. 2A, the buffer memory stores a total of 56 images disposed in a matrix pattern, i.e., image 0:1 (i.e., an image disposed at the position defined by the 0th column and the first line) to image 7:7 (i.e., an image disposed at the position define by the seventh column and the seventh line).

In other words, the number of the images stored in the buffer memory is greater than the number of images to be simultaneously displayed on one screen (i.e., images to be stored in the display oriented VRAM) because additional images are disposed on a preceding line as well as on a subsequent line.

Further, as illustrated in FIG. 2A, among the images stored in the buffer memory, a total of 42 images (i.e., images 1:1 to image 6:7) to be displayed on one screen is copied in the display oriented VRAM.

The images copied in the display oriented VRAM are displayed on the display device 110, as illustrated in FIGS. 2A to 2C.

In the present exemplary embodiment, it is desired to additionally display other icons and information together with the images copied in the display oriented VRAM.

FIG. 2B illustrates a transitional state of the display oriented VRAM and the buffer memory after the scrolling is further performed on the index display screen in the upward direction from the state illustrated in FIG. 2A.

As understood from the illustration in FIG. 2B, all images of the display oriented VRAM (i.e., display contents of the display device 110) are shifted upward compared to those illustrated in FIG. 2A.

In the following description, the above-described scroll direction is referred to as "up scroll." Namely, the scroll direction is referred to as the moving direction of images in the scroll.

The state illustrated in FIG. 2B differs from the above-described pre-scroll state in that the images disposed on the first line are partly displayed. The moving amount of the images in the above-described scrolling is less than one line.

As described above, if the scroll amount is less than the height of the lines additionally provided in the buffer memory (i.e., the preceding and subsequent lines in the present exemplary embodiment), the movement of the display position can be realized by simply shifting the position of an area to be copied from the buffer memory to the display oriented VRAM without updating the buffer memory.

A copy range indicated by a dotted line in FIG. 2B is shifted downward compared to a pre-scroll copy range (i.e., a range indicated by a dotted line illustrated in FIG. 2A) by an amount corresponding to the upward movement of the displayed images.

FIG. 2C illustrates another state of the display oriented VRAM and the buffer memory at the moment when the scrolling of just one line from the state illustrated in FIG. 2A has been completed via the state illustrated in FIG. 2B.

When the scrolling is continuously performed in the upward direction on the index display screen from the state illustrated in FIG. 2B, the range of images to be copied to the display oriented VRAM (i.e., the range displayed on the display device 110) becomes a range just covering the second line to the seventh line. In this case, if the scrolling further continues, images disposed on the eighth line are displayed.

Therefore, at this timing, the processing for updating the buffer memory is performed so as to move respective images by one line in such a way as to overwrite the area having been occupied by the images of the 0th line with the images of the first line and stores the images disposed on the first line to the eighth line.

The images to be disposed on the eighth line are not the images already stored in the buffer memory. Therefore, the processing for reading the images to be disposed on the eighth line from the external storage medium 108 is performed.

Further, the image processing unit 121 is used to perform the display preparation processing including decoding of compressed images and resizing of the decoded image so as to fit to the display size.

Therefore, the storage of images into the buffer memory for the eighth line is significantly delayed due to the above-described display preparation processing, compared to a case where images are immediately stored in the buffer memory.

The buffer memory illustrated in FIG. 2C is in a state where the scrolling of just one line has been completed. Therefore, in this state, image 8:1 to image 8:7 to be disposed on the eighth line are not yet stored in the buffer memory.

In the following description, it is assumed that each blackened portion of the buffer memory illustrated in the drawing is in a state where the image to be stored is not yet stored.

Figure 3A:
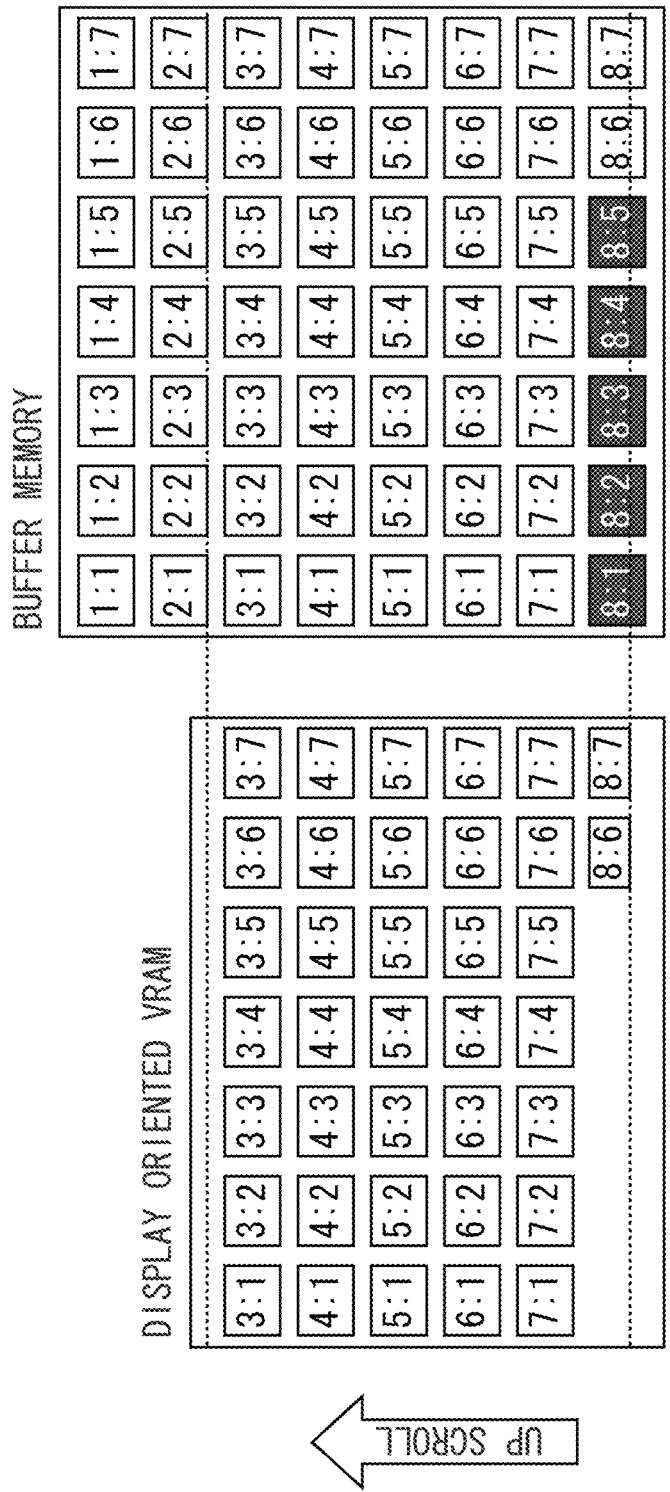
FIGS. 3A to 3C schematically illustrate a relationship between the display oriented VRAM and the buffer memory when the scrolling is further performed on the index display screen.

FIG. 3A illustrates a state of the display oriented VRAM and the buffer memory when the scrolling is further continued on the index display screen in the upward direction from the states illustrated in FIGS. 2A to 2C.

In this state, a line newly included in the copy range of images to be copied to the display oriented VRAM is the eighth line of the initial (pre-scroll) screen illustrated in FIG. 2A. More specifically, as apparent from FIG. 3A, the copy range indicated by a dotted line extends from the end of the second line (i.e., a border line between the second line and the third line) to an intermediate position of the eighth line.

However, in this case, the scrolling on the index display screen is so fast that the display preparation processing for image 8:1 to image 8:5 to be disposed on the eighth line cannot be completed. Therefore, the display oriented VRAM does not include a copy of the images 8:1 to 8:5. Accordingly, the images 8:1 to 8:5 cannot be displayed on the display device 110.

In the present exemplary embodiment, the display preparation processing for the images to be disposed on the same line is performed in such a way as to prioritize the display of an image farthest in layout order from the images having been already displayed before scrolling.

According to the example illustrated in FIG. 3A, the display preparation processing is performed in descending order from the image 8:7 that is further than the image 8:1 in layout order from the images 1:1 to 6:7 displayed in the pre-scroll screen illustrated in FIG. 2A.

Figure 3B:
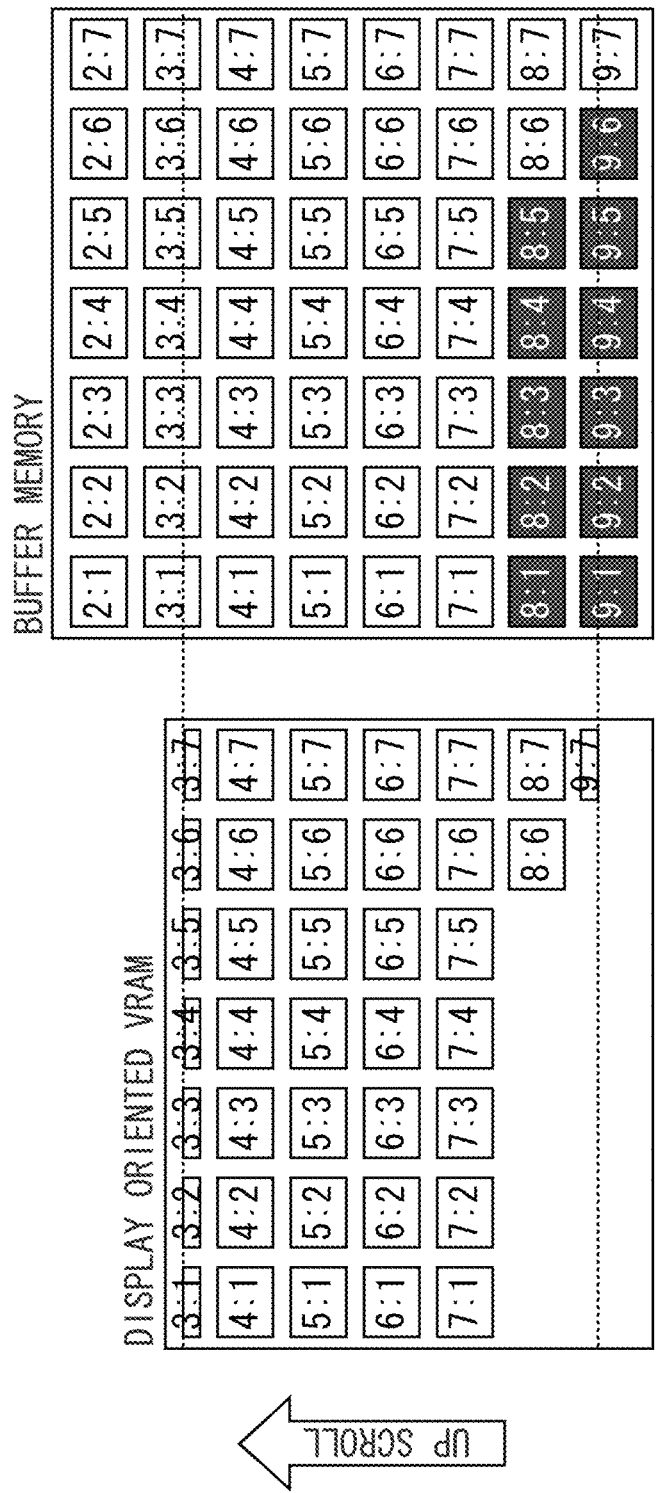

FIG. 3B illustrates a state of the display oriented VRAM and the buffer memory when the scrolling is further continued on the index display screen in the upward direction from the states illustrated in FIGS. 2A to 2C and FIG. 3A.

In this state, a line newly included in the copy range of images to be copied to the display oriented VRAM is the ninth line of the initial (pre-scroll) screen illustrated in FIG. 2A. More specifically, as apparent from FIG. 3B, the copy range indicated by a dotted line extends from an intermediate position of the third line to an intermediate position of the ninth line.

However, in this case, the scrolling on the index display screen is so fast that the display preparation processing for image 9:1 to image 9:6 to be disposed on the ninth line in addition to the images 8:1 to 8:5 to be disposed on the eighth line cannot be completed. Therefore, the display oriented VRAM does not include a copy of the images 8:1 to 8:5 and the images 9:1 to 9:6.

As described above, in the present exemplary embodiment, if the scrolling on the index display screen is so fast that the display preparation processing for all images to be disposed on the same line cannot be completed, the display preparation processing is performed in such a way as to prioritize an image to be displayed on a newly displayed line over a non-processed image to be disposed on a preceding line.

According to the illustrated example, if the scrolling on the index display screen is so fast that the display preparation processing for all images to be displayed on the eighth line cannot be completed, the display preparation processing for an image to be displayed on the newly displayed ninth line is prioritized over the display preparation processing for the non-processed image to be disposed on the eighth line.

The above-described prioritization processing is useful to prevent all of the images to be disposed on the same line from being not displayed in a case where the scrolling on the index display screen is so fast that the display preparation processing is significantly delayed.

Thus, the above-described prioritization processing enables users to easily and accurately recognize a scrolled state of the index display screen by checking each newly displayed line even if the displayed part is limited to a lesser number of images.

Figure 3C:
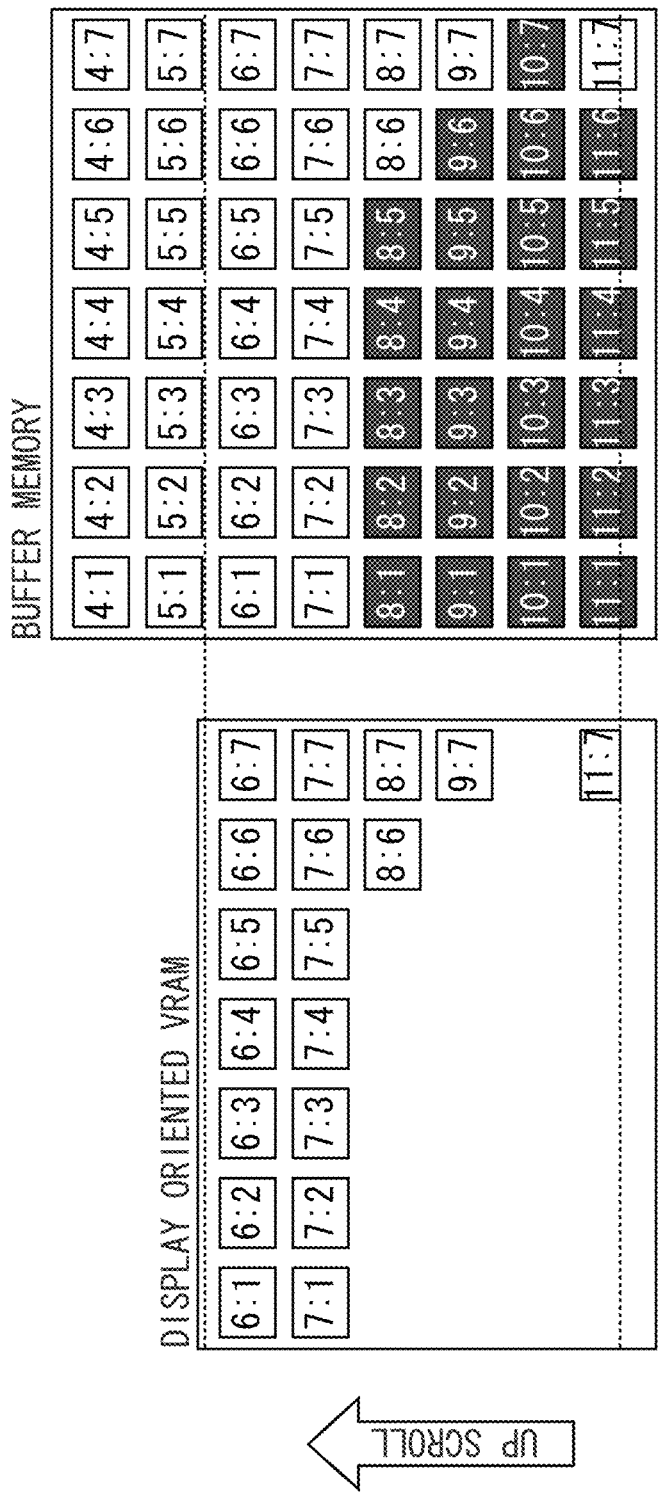

FIG. 3C illustrates a state of the display oriented VRAM and the buffer memory when the scrolling is further continued on the index display screen in the upward direction from the states illustrated in FIGS. 2A to 2C and FIGS. 3A and 3B.

In this state, a line newly included in the copy range of images to be copied to the display oriented VRAM is the eleventh line of the initial (pre-scroll) screen illustrated in FIG. 2A. More specifically, as apparent from FIG. 3C, the copy range indicated by a dotted line extends from the end of the fifth line (i.e., a border line between the fifth line and the sixth line) to an intermediate position of the eleventh line.

According to the illustrated example, the scrolling on the index display screen is so fast that a leading edge of scrolled lines has already reached the eleventh line before the display preparation processing for all of the images to be disposed on the tenth line in addition to the images 8:1 to 8:5 to be disposed on the eighth line and the images 9:1 to 9:6 to be disposed on the ninth line is completed.

Therefore, in this case, the display preparation processing for a new display target (i.e., an image 11:7 to be disposed on the eleventh line) is prioritized over the display preparation processing for the non-processed image to be disposed on the tenth line.

As described above, in the present exemplary embodiment, the display preparation processing for an image newly displayed according to the scrolling (e.g., an image to be displayed on the eleventh line) is performed at earlier timing compared to the display preparation processing for an image positioned closely in layout order to the images having been displayed before scrolling (e.g., an image to be disposed on the tenth line).

In other words, the display preparation processing for an image to be disposed on the opposite side with respect to the scroll direction (i.e., the moving direction of images in the scrolling) is performed at earlier timing compared to the display preparation processing for an image to be disposed on the same side with respect to the scroll direction.

In other words, the "opposite side with respect to the scroll direction" in the present exemplary embodiment is the upstream side with respect to the moving direction of images in the scrolling.

The images having been stored in the buffer memory as a result of the display preparation processing are continuously stored in the buffer memory, even when the scrolling is performed on the index display screen, as far as they are included in the copy range of the display oriented VRAM.

Then, compared to an image disposed closely to the opposite end side with respect to the scroll direction (i.e., the direction opposite to the moving direction of images (i.e., the upstream side)), an image disposed closely to the same direction with respect to the scroll direction (i.e., the moving direction of images (i.e., the downstream side)) becomes a non-display target at earlier timing when the scrolling is performed on the index display screen.

In the present exemplary embodiment, "becoming a non-display target" means that a concerned image is excluded from the copy range to be copied to the display oriented VRAM.

More specifically, an image disposed on a line positioned closely to the opposite end side with respect to the scroll direction (i.e., closely to the upstreammost side) can remain as a display target for a relatively long time compared to other images stored in the buffer memory.

Accordingly, the above-described image tends to remain as the display target (i.e., tends to be included in the copy range to be copied to the display oriented VRAM) at the completion timing of the display preparation processing.

In other words, when the display preparation processing is once started and if the display preparation processing is not completed, the possibility that the above-described image is excluded from the copy range to be copied to the display oriented VRAM and is not displayed on the display device 110 is very low.

As described above, the display preparation processing according to the present exemplary embodiment is performed in such a way as to prioritize an image to be disposed on the line positioned closely to the opposite end side with respect to the scroll direction (i.e., the direction opposite to the moving direction of images (i.e., the upstreammost side)) over other images included in the copy range to be copied to the display oriented VRAM.

In this respect, the display preparation processing according to the present exemplary embodiment is useful because at least one of the images to be displayed can be surely displayed on the index display screen even when the scroll speed is increased.

Although the scrolling on the index display screen is performed in the upward direction according to the example illustrated in FIGS. 2 and 3, it is needless to say that the scrolling can be oppositely performed in the downward direction.

FIG. 4 illustrates a schematic relationship between the display oriented VRAM and the buffer memory when the scrolling is performed on the index display screen in the downward direction.

Next, an example procedure of processing that can realize the above-described operations is described below in detail with reference to flowcharts illustrated in FIG. 5 to FIG. 8. To realize the flowcharts illustrated in FIG. 5 to FIG. 8, the CPU 101 executes a control program loaded from the nonvolatile memory 102 to the work memory area of the memory 103 so that the CPU 101 can control various components of the digital camera 100.

In the present exemplary embodiment, some terminologies in the flowcharts illustrated in FIG. 5 to FIG. 8 are defined in the following manner.

More specifically, in the context of the present disclosure, the terminology "display order" is referred to as a parameter that indicates whether the temporal priority order in performing the display preparation processing is set in order from an upper line to a lower line or in order from a lower line to an upper line of the matrix displayed on the display device 110.

In other words, the "display order" is a parameter that is variable depending on the scroll direction and is stored in the memory 103.

In the context of the present disclosure, the terminology "processing target line (or processing target column)" is referred to as a parameter that indicates a line (or a column) representing the layout position of an image to be added to the buffer memory after it is subjected to the display preparation processing at a certain time.

The layout of an image is a fixed one that is substantially dependent on image unique information (e.g., image file name, file number, and shooting date/time). Therefore, if the layout position in the index display is known, each image can be identified by checking the layout order of the image. The processing target line (or the processing target column) is stored in the memory 103.

In the context of the present disclosure, the terminology "line offset" is referred to as a parameter that indicates a shift amount of the copy range to be copied from the buffer memory to the display oriented RAM.

To realize a smooth and fine animation, it is desired that the "line offset" is a numerical value equal to or less than one line. The "line offset" is stored in the memory 103.

In the context of the present disclosure, the terminology "line offset regulating value" is referred to as a setting value indicating the number of times of the display frequently updated during the scrolling of one line.

In other words, the line offset regulating value is a setting value indicating a line offset value in the scrolling of one line.

The line offset regulating value is stored beforehand in the nonvolatile memory 102. If the line offset regulating value is large, the animation is fine. If the regulating value is smaller, the animation is coarse.

The line offset regulating value satisfies the following formula.

[The moving amount of an image displayed on the display screen in each update of the display for the animation]=[the number of lines constituting the display oriented VRAM and the buffer memory in the vertical direction that are used to display images disposed on the same line]/ [the line offset regulating value]

In the context of the present disclosure, the terminology "scroll counter" is referred to as a parameter indicating the number of lines to be further scrolled at a certain time. The scroll counter value is incremented or decremented in response to each instruction entered by a user to perform scrolling on the index display screen. When the scrolling is actually performed, the scroll counter value is incremented or decremented by an amount corresponding to the number of lines having been scrolled.

In the context of the present disclosure, the terminology "animation timer" is referred to as a timer that counts the time period used to complete each update of the display during the scrolling.

In general, a reciprocal of the time period measured by the animation timer is equal to a frame rate. If the time period measured by the animation timer is smaller, the frame rate of the animation increases and the processing load of the system increases. In the present exemplary embodiment, the time period is a setting value (e.g., several tens msec).

FIG. 5 is a flowchart illustrating an example of the index display processing. The CPU 101 starts the index display processing in response to a user's operation instructing a switching of the image display mode to an index display mode.

First, in step S501, the CPU 101 performs parameter initialization processing to set initial values for the display order (=from top to bottom), the processing target line (=the upper edge of the copy range to be copied to the display oriented VRAM), the processing target column (=the left edge of each line), and the line offset (=0). The CPU 101 stores the initial setting values in the memory 103.

In step S502, the CPU 101 determines whether to terminate the index display processing. For example, when a power source of the digital camera 100 is turned off or when a user's operation instructs a switching of the image display mode to a mode other than the index display mode (YES in step S502), the CPU 101 determines to terminate the index display. After completing the above-described processing, the CPU 101 terminates the index display processing illustrated in FIG. 5.

If an instruction to complete the index display is not received (NO in step S502), the CPU 101 determines to continue the index display processing. The processing proceeds to step S503.

In step S503, the CPU 101 performs scroll control processing. The scroll control processing is described below in detail with reference to the flowcharts illustrated in FIG. 6 and FIG. 7.

The scroll control processing includes, for example, processing for determining the number of lines to be scrolled, processing for determining the order of images to be displayed, processing for actually performing the scrolling, and processing for determining a processing target line (or column) based on a present state of the scrolling and a present state of the display preparation processing.

In step S504, the CPU 101 determines whether all of images presently designated as the display targets to be displayed on the same screen have been thoroughly displayed. More specifically, the CPU 101 determines whether the display preparation processing for all images to be copied to the display oriented VRAM.

If it is determined that all the display targets have been displayed (YES in step S504), the processing returns to step S502. If it is determined that the display targets are not thoroughly displayed (NO in step S504), the processing proceeds to step S505.

In step S505, the CPU 101 determines whether the display preparation processing for each image to be displayed has been completed. If it is determined that the display preparation processing for each image to be displayed is not yet completed (NO in step S505), the processing returns to step S502. If it is determined that the display preparation processing for each image to be displayed has been completed (YES in step S505), the processing proceeds to step S506.

In step S506, the CPU 101 adds the display preparation completed images to the buffer memory. Thus, when the display oriented VRAM is updated in step S707 or S708 illustrated in FIG. 7, new images are displayed on the display device 110.

If the scrolling stops, the animation timer stops counting. In this case it is assumed that, every time when the display preparation processing for non-stored images is completed and the processed images are added to the buffer memory, the copy of images from the buffer memory to the display oriented VRAM is performed regardless of the animation timer.

Thus, the images added through the display preparation processing after the scrolling is stopped are successively displayed on the display device 110.

In step S507, the CPU 101 starts the display preparation processing for each image to be disposed at the position identified by the present processing target line and the present processing target column.

The CPU 101 and the image processing unit 121 operate cooperatively to perform the display preparation processing in parallel with processing of subsequent steps. Namely, the processing proceeds to step S508 even when the display preparation processing is not completed.

In step S508, the CPU 101 performs processing target column control processing for determining a new processing target column. The processing target column control processing is described below in more detail with reference to the flowchart illustrated in FIG. 8.

Figure 6:
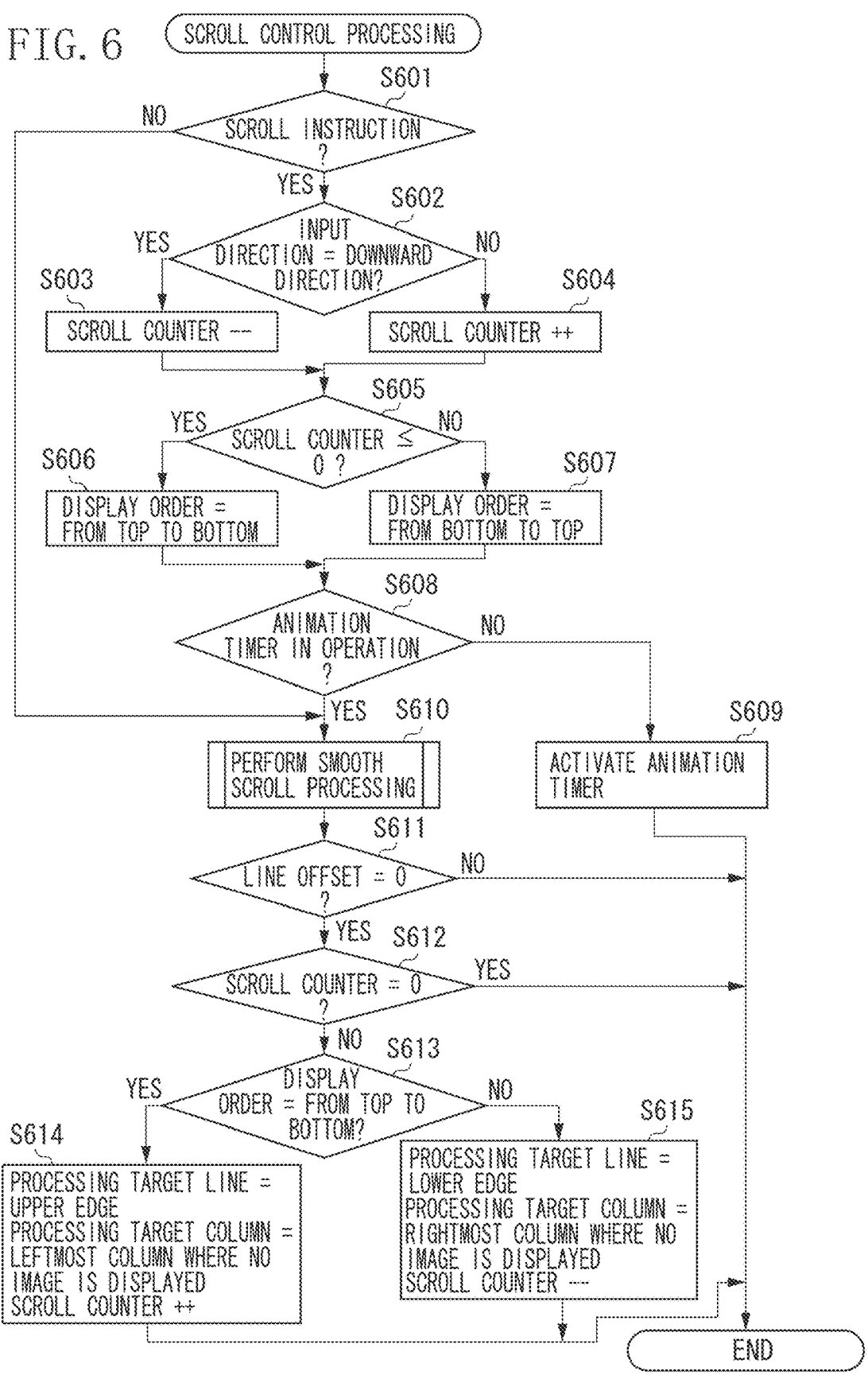
FIG. 6 is a flowchart illustrating scroll control processing according to an exemplary embodiment of the present invention.

Next, the scroll control processing is described below in more detail with reference to a flowchart illustrated in FIG. 6. The scroll control processing illustrated in FIG. 6 is details of the processing to be performed in step S503 illustrated in FIG. 5.

In step S601, the CPU 101 determines whether a user's scroll instruction is input. In the present exemplary embodiment, the scrolling on the index display screen can be arbitrarily performed in the upward direction or in the downward direction according to the input scroll instruction.

For example, if an up button (i.e., one of the direction buttons disposed in a cross shape on the input unit 105) is pressed, the CPU 101 determines that the scrolling in the downward direction (i.e., the scrolling for moving the displayed images downward to browse images positioned above the presently displayed images) is instructed.

On the other hand, if a down button is pressed, the CPU 101 determines that scrolling in the upward direction (i.e., the scrolling for moving the displayed images upward to browse images positioned below the presently displayed images) is instructed.

If a touch panel is usable to instruct the scrolling, the CPU 101 determines that scrolling in the upward direction is instructed when the touch panel operation from bottom to top is performed. Further, the CPU 101 determines that the scrolling in the downward direction is instructed when the touch panel operation from top to bottom is performed.

It is also useful to rotate the rotary wheel to instruct a rotational direction in the scrolling to be performed.

If it is determined that the scroll instruction is input (YES in step S601), the processing proceeds to step S602. If it is determined that the scroll instruction is not input (NO in step S601), the processing proceeds to step S610.

In step S602, the CPU 101 determines whether the scroll instruction accepted in step S601 instructs the scrolling in the downward direction. If it is determined that the scrolling in the downward direction is instructed (YES in step S602), the processing proceeds to step S603. Otherwise, namely if it is determined that the scrolling in the upward direction is instructed (NO in step S602), the processing proceeds to step S604.

In step S603, the CPU 101 decrements a scroll counter value by an amount of an operation according to the scroll instruction accepted in step S601.

For example, if the up button (i.e., one of the direction buttons) is pressed one time, the CPU 101 decrements the scroll counter value by one. If the touch panel operation from top to bottom is performed, the CPU 101 decrements the scroll counter value by an amount corresponding to the moving distance in the touch panel operation.

If the scroll counter value becomes a negative value as a result of the above-described operation, the CPU 101 determines to perform the scrolling on the index display screen in the downward direction by the number of lines indicated by an absolute value of the scroll counter, as described below.

Namely, while the presently displayed images move downward, new images (i.e., hidden images positioned above the pre-scroll screen) are displayed.

In step S604, the CPU 101 increments the scroll counter value by an amount of an operation according to the scroll instruction accepted in step S601. The processing to be performed in step S604 is contrary to the processing to be performed in step S603.

If the scroll counter value becomes a positive value as a result of the above-described operation, the CPU 101 determines to perform scrolling on the index display screen in the upward direction by the number of lines indicated by the value of the scroll counter, as described below.

Namely, while the presently displayed images move upward, new images (i.e., hidden images positioned below the pre-scroll screen) are displayed.

In step S605, the CPU 101 determines whether the scroll counter value is equal to or less than zero. When the scroll counter value is a negative value, the CPU 101 determines that the scroll direction is the downward direction. On the other hand, when the scroll counter value is a positive value, the CPU 101 determines that the scroll direction is the upward direction.

If it is determined that the scroll counter value is equal to or less than zero (YES in step S605), the processing proceeds to step S606. If it is determined that the scroll counter value is a positive value (NO in step S605), the processing proceeds to step S607.

In step S606, the CPU 101 sets the display order (i.e., the priority order according to which the display preparation processing is performed) in such away as to perform the display preparation processing in order from an upper line to a lower line on a matrix displayed on the display device 110. Then, the CPU 101 stores the determined display order in the memory 103.

In the present exemplary embodiment, a higher priority order is set for the upper line positioned in the direction opposite to the downward direction (i.e., the moving direction of the images in the down scroll).

In step S607, the CPU 101 sets the display order in such a way as to perform the display preparation processing in order from a lower line to an upper line (i.e., opposite order) on a matrix displayed on the display device 110. Then, the CPU 101 stores the determined display order in the memory 103.

In the present exemplary embodiment, a higher priority order is set for the lower line positioned in the direction opposite to the upward direction (i.e., the moving direction of the images in the up scroll).

In step S608, the CPU 101 determines whether the animation timer is in operation. More specifically, the CPU 101 determines whether the scrolling is currently performed on the index display screen.

If it is determined that the animation timer is not in operation, i.e., if it is determined that scrolling is not performed on the index display screen (NO in step S608), the processing proceeds to step S609.

In step S609, the CPU 101 activates the animation timer to execute the scrolling according to the scroll instruction accepted in step S601. Then, the CPU 101 terminates the scroll control processing illustrated in FIG. 6. Subsequently, the control processing of the CPU 101 proceeds to step S504 illustrated in FIG. 5.

On the other hand, if it is determined that the animation timer is in operation, i.e., if it is determined that scrolling is currently performed on the index display screen (YES in step S608), the processing proceeds to step S610.

In step S610, the CPU 101 performs smooth scroll processing. The smooth scroll processing is scroll processing intended to realize a smooth animation by repetitively shifting a portion to be copied from the buffer memory to the display oriented VRAM by an amount corresponding to the line offset every time the animation timer times out.

The smooth scroll processing is described below in more detail with reference to the flowchart illustrated in FIG. 7.

In step S611, the CPU 101 determines whether the line offset is zero. If it is determined that the line offset is zero (YES in step S611), the processing proceeds to step S612.

When the line offset is zero, an image group to be displayed on the index display screen can be located in such a way as to just coincide with a predetermined integer-number of lines.

On the other hand, if it is determined that the line offset is not zero (NO in step S611), the CPU 101 terminates the scroll control processing illustrated in FIG. 6. Subsequently, the control processing of the CPU 101 proceeds to step S504 illustrated in FIG. 5.

When the line offset is not zero, the image group to be displayed on the index display screen is located in such a way as to deviate from the integer-number of lines by an amount corresponding to the line offset. In other words, the scrolling is not yet completed and the animation timer is in operation.

In step S612, the CPU 101 determines whether the scroll counter value is zero. More specifically, the CPU 101 determines whether to further continue the scrolling when the image group to be displayed on the index display screen is located in such a way as to just coincide with the predetermined integer-number of lines.

If it is determined that the scroll counter value is zero (YES in step S612), it is unnecessary to further perform the scrolling. Therefore, the CPU 101 terminates the scroll control processing illustrated in FIG. 6. Subsequently, the control processing of the CPU 101 proceeds to step S504.

If it is determined that the scroll counter value is not zero (NO in step S612), the processing proceeds to step S613 to continue the scrolling for another line.

In step S613, the CPU 101 determines whether the display order stored in the memory 103 is a setting for displaying the images in order from an upper line to a lower line. If it is determined that the display order is for displaying the images from an upper line to a lower line (YES in step S613), the processing proceeds to step S614.

Otherwise, namely if it is determined that the display order is for displaying the images in order from a lower line to an upper line (NO in step S613), the processing proceeds to step S615.

In step S614, to prioritize the display preparation processing for a line to be newly displayed on the index display screen over the display preparation processing for the presently processed image, the CPU 101 updates the processing target line and the processing target column in accordance with the downward scrolling for another line. Then, the CPU 101 decrements the scroll counter value by one.

The CPU 101 sets an upper edge line of an image region to be displayed on the display device 110 (i.e., an upper edge line of an image range to be copied from the buffer memory to the display oriented VRAM) as a processing target line. Then, the CPU 101 stores the determined processing target line in the memory 103.

Further, the CPU 101 sets a leftmost column where no image is displayed as a processing target column. Then, the CPU 101 stores the determined processing target column in the memory 103. Then, the CPU 101 increments the scroll counter value by one.

In step S615, to prioritize the display preparation processing for a line to be newly displayed on the index display screen over the display preparation processing for the presently processed image, the CPU 101 updates the processing target line and the processing target column in accordance with the upward scrolling for another line. Then, the CPU 101 decrements the scroll counter value by one.

The CPU 101 sets a lower edge line of an image region to be displayed on the display device 110 (i.e., a lower edge line of an image range to be copied from the buffer memory to the display oriented VRAM) as a processing target line. Then, the CPU 101 stores the determined processing target line in the memory 103.

Further, the CPU 101 sets a rightmost column where no image is displayed as a processing target column. Then, the CPU 101 stores the determined processing target column in the memory 103. Then, the CPU 101 decrements the scroll counter value by one.

After completing the processing of step S614 or step S615, the CPU 101 terminates the scroll control processing illustrated in FIG. 6. Subsequently, the control processing of the CPU 101 proceeds to step S504 illustrated in FIG. 5.

Next, the smooth scroll processing is described in more detail with reference to the flowchart illustrated in FIG. 7. The smooth scroll processing illustrated in FIG. 7 is details of the processing to be performed in step S610 illustrated in FIG. 6.

In step S701, the CPU 101 determines whether the animation timer is in operation. If it is determined that the animation timer is not in operation (NO in step S701), it is unnecessary to perform the scroll animation display.

Figure 7:
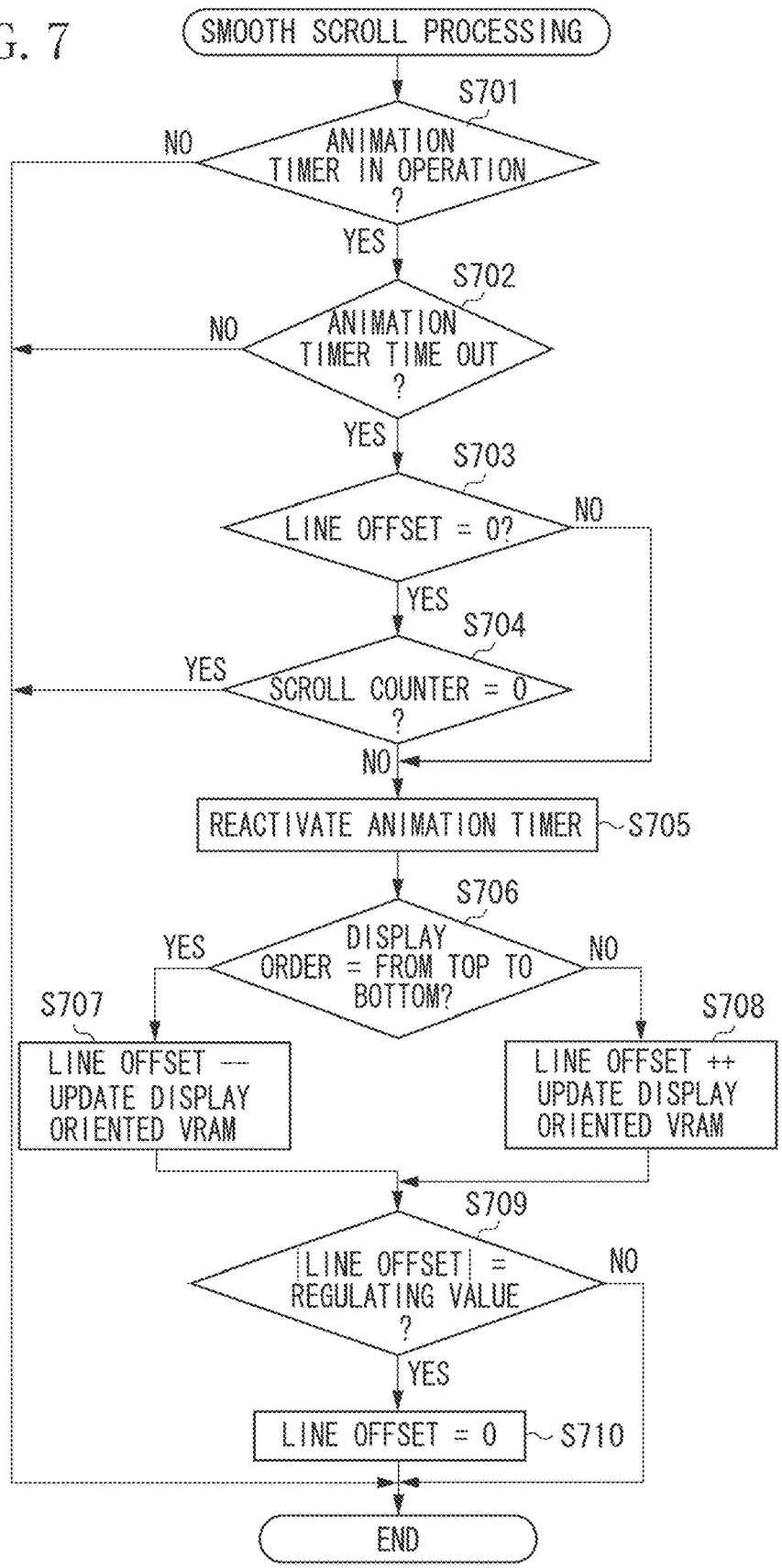
FIG. 7 is a flowchart illustrating smooth scroll processing according to an exemplary embodiment of the present invention.

Therefore, the CPU 101 terminates the smooth scroll processing illustrated in FIG. 7. Subsequently, the control processing of the CPU 101 proceeds to step S611 illustrated in FIG. 6. If it is determined that the animation timer is in operation (YES in step S701), the processing proceeds to step S702.

In step S702, the CPU 101 determines whether the animation timer has timed out. If it is determined that the animation timer has not yet timed out (NO in step S702), it is unnecessary to update the display.

Therefore, the CPU 101 terminates the smooth scroll processing illustrated in FIG. 7. Subsequently, the control processing of the CPU 101 proceeds to step S611 illustrated in FIG. 6.

On the other hand, if it is determined that the animation timer has timed out (YES in step S702), the display is to be updated. Therefore, the processing proceeds to step S703.

In step S703, the CPU 101 determines whether the line offset is zero. When the line offset is not zero, the image group to be displayed on the index display screen is located in such a way as to deviate from the integer-number of lines by an amount corresponding to the line offset. In other words, the scrolling is not yet completed.

Accordingly, if it is determined that the line offset is not zero (NO in step S703), the processing proceeds to step S705. In step S705, the CPU 101 reactivates the animation timer to measure the time for the next update of the display.

On the other hand, if it is determined that the line offset is zero (YES in step S703), the processing proceeds to step S704.

In step S704, the CPU 101 determines whether the scroll counter value is zero. When the line offset is zero and the scroll counter value is zero, the image group is located in such a way as to just coincide with the integer-number of lines. Therefore, it is unnecessary to continue the scrolling for another line. The CPU 101 does not update the display for the animation.

Then, the CPU 101 terminates the smooth scroll processing illustrated in FIG. 7. Subsequently, the control processing of the CPU 101 proceeds to step S611 illustrated in FIG. 6.

On the other hand, if it is determined that the scroll counter value is not zero (NO in step S704), further continue the scrolling is to be performed. The processing proceeds to step S705.

In step S705, the CPU 101 reactivates the animation timer to measure the time for the next update of the display for the animation.

In step S706, the CPU 101 determines whether the display order stored in the memory 103 is for displaying the images in order from an upper line to a lower line. If it is determined that the display order is for displaying the images from an upper line to a lower line (YES in step S706), the processing proceeds to step S707.

Otherwise, namely if it is determined that the display order is for displaying the images in order from a lower line to an upper line (NO in step S706), the processing proceeds to step S708.

The determination to be performed in step S706 is a step of determining the scroll direction to adjust the shift direction of the line offset to be identical to the scroll direction.

Accordingly, the determination of the display order in step S706 can be replaced by a determination as to whether the scroll counter value is equal to or less than zero.

In step S707, the CPU 101 decrements the line offset by one so that the displayed image group can be moved downward by one line for the downward scrolling animation. Then, the CPU 101 updates the display oriented VRAM by shifting the copy range to be copied from the buffer memory to the display oriented VRAM by an amount corresponding to the updated line offset value.

In this case, the CPU 101 shifts the copy range upward by one line. The following relationship is satisfied as described above.

[The moving amount (the number of lines) of an image displayed on the display screen in each update of the display for the animation]=[the number of lines constituting the display oriented VRAM and the buffer memory in the vertical direction that are required to display images disposed on the same line]/[the line offset regulating value].

Through the above-described processing, the images displayed on the display device 110 can be updated.

On the contrary, in step S708, the CPU 101 increments the line offset by one so that the displayed image group can be moved upward by one line for the upward scrolling animation.

Then, the CPU 101 updates the display oriented VRAM by shifting the copy range to be copied from the buffer memory to the display oriented VRAM by an amount corresponding to the updated line offset value.

In this case, the CPU 101 shifts the copy range downward by one line. Through the above-described processing, the images displayed on the display device 110 can be updated.

In step S709, the CPU 101 determines whether the absolute value of the line offset has reached the regulating value. If it is determined that the absolute value of the line offset has reached the regulating value (YES in step S709), the processing proceeds to step S710.

The absolute value of the line offset reaches the regulating value at the timing the scrolling of just one line has completed. If it is determined that the absolute value of the line offset has not reached the regulating value (NO in step S709), the CPU 101 terminates the smooth scroll processing illustrated in FIG. 7. Subsequently, the control processing of the CPU 101 proceeds to step S611 illustrated in FIG. 6.

In step S710, the CPU 101 sets the line offset to zero to set the shift amount of the copy range to be copied from the buffer memory to the display oriented VRAM to zero. At the same time, the CPU 101 updates the images stored in the buffer memory in such a way as to shift downward or upward by one line according to the scroll operation.

However, as described with reference to FIG. 2C, the storage of images into the buffer memory for a new line is significantly delayed due to the above-described display preparation processing for respective images to be updated.

In other words, the storage of newly displayed images is performed sequentially, not simultaneously, because the above-described display preparation processing for each image takes a significant time.

After completing the processing of step S710, the CPU 101 terminates the smooth scroll processing illustrated in FIG. 7. Subsequently, the control processing of the CPU 101 proceeds to step S611 illustrated in FIG. 6.

Figure 8:
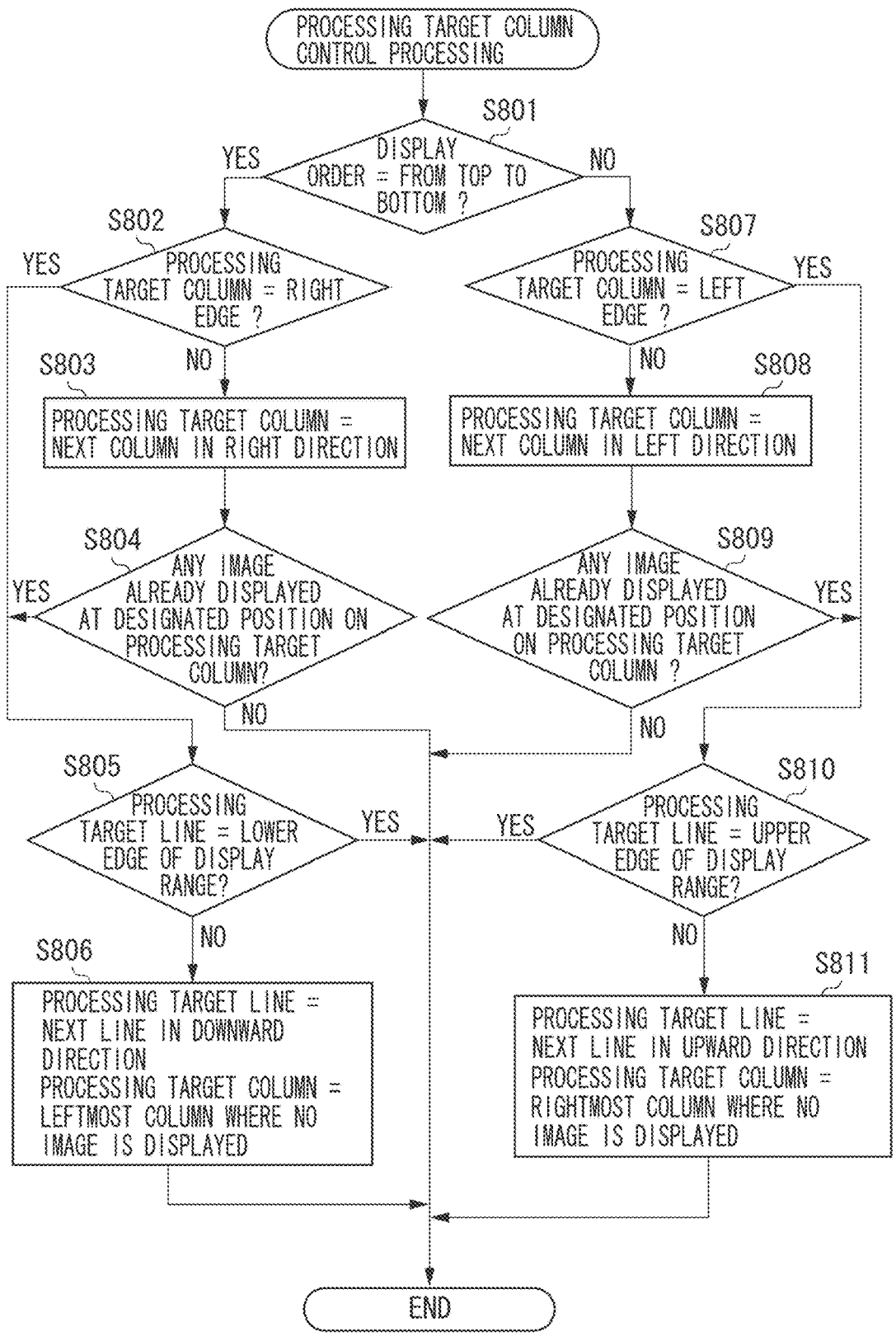
FIG. 8 is a flowchart illustrating processing target column control processing according to an exemplary embodiment of the present invention.

Next, the processing target column control processing is described below in more detail with reference to the flowchart illustrated in FIG. 8. The processing target column control processing illustrated in FIG. 8 is details of the processing to be performed in step S508 illustrated in FIG. 5.

In step S801, the CPU 101 determines whether the display order stored in the memory 103 is for displaying the images in order from an upper line to a lower line. If it is determined that the display order is for displaying the images in order from an upper line to a lower line (YES in step S801), the processing proceeds to step S802.

Otherwise, namely if it is determined that the display order is for displaying the images in order from a lower line to an upper line (NO in step S801), the processing proceeds to step S807.

In step S802, the CPU 101 determines whether the processing target column stored in the memory 103 is the right edge. If it is determined that the processing target column is the right edge (YES in step S802), the processing proceeds to step S805. Otherwise, namely if it is determined that the processing target column is not the right edge (NO in step S802), the processing proceeds to step S803.

In step S803, the CPU 101 shifts the processing target column from the presently set column to the next column in the right direction. Then, the CPU 101 stores the newly set processing target column in the memory 103.

Then, in step S804, the CPU 101 determines whether an image is already displayed at the position corresponding to the newly set processing target column.

More specifically, the CPU 101 determines whether a display preparation completed image is already stored in the buffer memory at a position corresponding to the newly set processing target column.

If it is determined that there is an already displayed image (YES in step S804), the processing proceeds to step S805. If it is determined that there is not any displayed image (NO in step S804), the CPU 101 terminates the processing target column control processing illustrated in FIG. 8. Subsequently, the control processing of the CPU 101 proceeds to step S502 illustrated in FIG. 5.

When there is not any displayed image at the corresponding column position, the CPU 101 designates the processing target column having been set in step S803 as a column to be next subjected to the display preparation processing (if the scrolling is not performed on the index display screen).

The CPU 101 performs the processing of step S805 when it is determined that the processing target column is the right edge (YES in step S802) or when it is determined that there is an image already displayed in the processing target column (YES in step S804).

More specifically, at this moment, the display preparation processing for all images to be disposed on the processing target line is already completed. Therefore, the CPU 101 performs the processing for updating the processing target line.

In step S805, the CPU 101 determines whether the processing target line stored in the memory 103 is the lower edge of the copy range to be copied to the display oriented VRAM.

If it is determined that the processing target line is the lower edge (YES in step S805), the display preparation processing for all images to be displayed on the present screen is already completed. Therefore, at this moment, there is not any image to be subjected to the display preparation processing unless the scrolling is performed on the index display screen.

Accordingly, the CPU 101 terminates the processing target column control processing illustrated in FIG. 8. Subsequently, the control processing of the CPU 101 proceeds to step S502 illustrated in FIG. 5. If it is determined that the processing target line is not the lower edge (NO in step S805), the processing proceeds to step S806.

In step S806, the CPU 101 shifts the processing target line from the presently set line to the next line in the downward direction. Then, the CPU 101 stores the newly set processing target line in the memory 103.

Further, the CPU 101 sets a leftmost column where no image is displayed as a processing target column. Then, the CPU 101 stores the newly set processing target column in the memory 103.

Then, the CPU 101 terminates the processing target column control processing illustrated in FIG. 8. Subsequently, the control processing of the CPU 101 proceeds to step S502 illustrated in FIG. 5.

The processing to be performed in step S807 to step S811 is different from the above-described processing of steps S802 to S806 in that the scroll direction is opposite.

In step S807, the CPU 101 determines whether the processing target column stored in the memory 103 is the left edge. If it is determined that the processing target column is the left edge (YES in step S807), the processing proceeds to step S810. Otherwise, namely if it is determined that the processing target column is not the left edge (NO in step S807), the processing proceeds to step S808.

In step S808, the CPU 101 shifts the processing target column from the presently set column to the next column in the left direction. Then, the CPU 101 stores the newly set processing target column in the memory 103.

Then, in step S809, the CPU 101 determines whether an image is already displayed at the position corresponding to the newly set processing target column.

More specifically, the CPU 101 determines whether a display preparation completed image is already stored in the buffer memory at a position corresponding to the newly set processing target column.

If it is determined that there is an already displayed image (YES in step S809), the processing proceeds to step S810. If it is determined that there is not any displayed image (NO in step S809), the CPU 101 terminates the processing target column control processing illustrated in FIG. 8. Subsequently, the control processing of the CPU 101 proceeds to step S502 illustrated in FIG. 5.

When there is not any displayed image at the corresponding column position, the CPU 101 designates the processing target column having been set in step S808 as a column to be next subjected to the display preparation processing (if the scrolling is not performed on the index display screen).

The CPU 101 performs the processing of step S810 when it is determined that the processing target column is the left edge (YES in step S807) or when it is determined that there is an image already displayed in the processing target column (YES in step S809).

More specifically, at this moment, the display preparation processing for all images to be disposed on the processing target line is already completed. Therefore, the CPU 101 performs the processing for updating the processing target line.

In step S810, the CPU 101 determines whether the processing target line stored in the memory 103 is the upper edge of the copy range to be copied to the display oriented VRAM.

If it is determined that the processing target line is the upper edge (YES in step S810), the display preparation processing for all images to be displayed on the present screen is already completed. Therefore, at this moment, there is not any image to be subjected to the display preparation processing unless the scrolling is performed on the index display screen.

Accordingly, the CPU 101 terminates the processing target column control processing illustrated in FIG. 8. Subsequently, the control processing of the CPU 101 proceeds to step S502 illustrated in FIG. 5. If it is determined that the processing target line is not the upper edge (NO in step S810), the processing proceeds to step S811.

In step S811, the CPU 101 shifts the processing target line from the presently set line to the next line in the upward direction. Then, the CPU 101 stores the newly set processing target line in the memory 103.

Further, the CPU 101 sets a rightmost column where no image is displayed as a processing target column. Then, the CPU 101 stores the newly set processing target column in the memory 103.

Then, the CPU 101 terminates the processing target column control processing illustrated in FIG. 8. Subsequently, the control processing of the CPU 101 proceeds to step S502 illustrated in FIG. 5.

Although not illustrated in each of the above-described flowcharts, it is useful to permit users to input a scroll stop instruction via the input unit 105. In this case, before executing the processing of step S601 illustrated in FIG. 6, the CPU 101 determines whether a scroll stop instruction is input.

In this case, if it is determined that the scroll stop instruction is not input, the processing proceeds to step S601.

If it is determined that the scroll stop instruction is input, the CPU 101 sets the scroll counter value to zero. Subsequently, the processing proceeds to step S601.

According to the above-described processing, users can stop the scrolling at arbitrary timing while viewing the images displayed on the scrolled screen.

Further, in the above-described flowchart, the moving amount of the displayed images in each update of the display for a smooth animation is set to be less than one line. However, any other moving amount can be arbitrarily set. For example, the scrolling on the display screen can be performed on a line-to-line basis. In this case, the line offset regulating value is set to 1.

The CPU 101 executes the above-described processing illustrated in FIGS. 5 to 8 to realize the scrolling operation described with reference to FIGS. 2 to 4. According to the processing illustrated in FIGS. 5 to 8, as already described with reference to FIGS. 2 to 4, the CPU 101 prioritizes the display preparation processing for an image to be displayed on a new line, if a user performs scrolling on the index display screen to display images of a new line at a certain time when the display preparation processing for the image to be disposed on the presently processed line is not yet completed.

Thus, the display control apparatus according to the present exemplary embodiment can avoid the situation where a newly displayed screen does not include any image when the scroll speed is increased.

In other words, the display control apparatus according to the present exemplary embodiment can display a relatively large number of images even when the scrolling is performed on the index display screen at a higher speed.

Further, the display control apparatus according to the present exemplary embodiment prioritizes the display preparation processing for an image positioned farther from the images having been already displayed on the pre-scroll screen, in layout order, than other images to be disposed on the same line, considering the scroll direction.

Therefore, users can immediately confirm a range of newly displayed images while the scrolling is successively performed on the index display screen.

Accordingly, after a user performs a scroll instruction operation, the user can easily determine the time to stop the scrolling. Further, the display control apparatus according to the present exemplary embodiment can reduce the number of images that are not yet displayed because a relatively large number of images can be displayed while the scrolling is performed on the index display screen.

Accordingly, the display control apparatus according to the present exemplary embodiment can reduce the processing time used, after the scrolling is stopped, to display all of the remaining images to be displayed. Thus, it is unnecessary for users to wait for a long time until all of the images are completely displayed after the scrolling is stopped.

Further, in the above-described exemplary embodiments, the scrolling is performed in the up-and-down direction. However, the present invention is similarly applicable to a scrolling that is performed in the right-and-left direction. Further, the present invention is applicable to any other scrolling to be performed in an arbitrary direction (including an oblique direction).

In this case, effects similar to those of the above-described exemplary embodiment can be obtained by prioritizing the display processing for a newly displayed image over the display processing for images included in the pre-scroll display range.

The buffer memory illustrated in FIG. 2A has upper and lower storage areas, each corresponding to one line, which are additionally provided above and below the lines displayed on the display device 110.

However, it is useful to provide larger preliminary storage areas each composed of a plurality of lines.

In this case, the CPU 101 continuously performs the display preparation processing for another images remaining in the preliminary area after it is determined that all the display targets have been displayed (YES in step S504 illustrated in FIG. 5).

Figure 9:
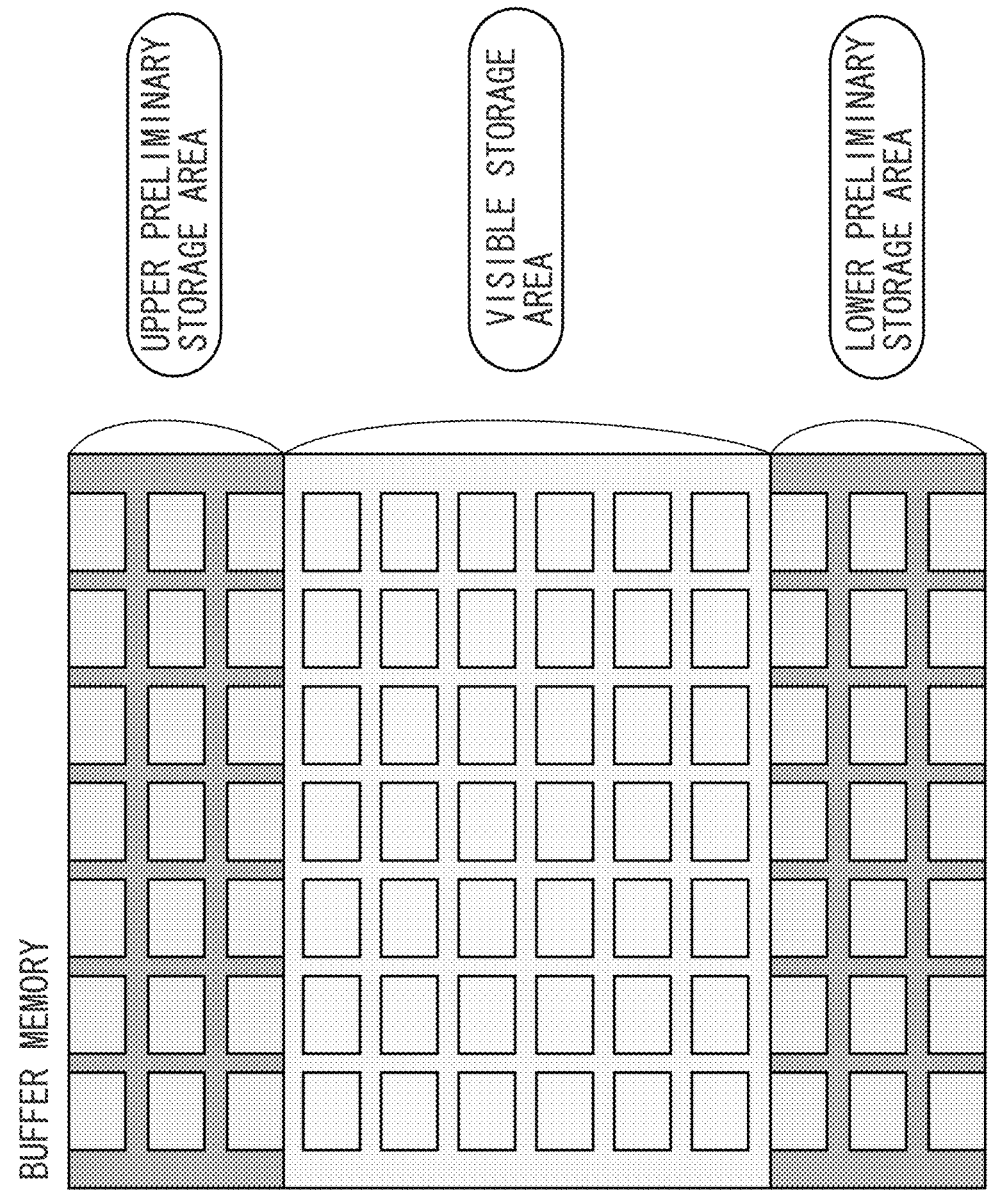
FIG. 9 schematically illustrates a buffer memory including preliminary storage areas.

FIG. 9 illustrates an example of the buffer memory that includes widened storage areas each being composed of three lines, provided above and below the lines displayed on the display device 110.

A storage area to be copied to the display oriented VRAM when the line offset is zero is referred to as a "visible storage area." A preliminarily prepared storage area composed of three lines positioned above the visible storage area is referred to as an "upper preliminary storage area." Another preliminarily prepared storage area composed of three lines positioned below the visible storage area is referred to as a "lower preliminary storage area."

The CPU 101 performs the display preparation processing for images to be stored in the visible storage area according to the order described with reference to FIGS. 5 to 8.

Subsequently, the CPU 101 prioritizes the display preparation processing for images to be disposed on a newly displayed line if the scrolling is continuously performed on the index display screen in the same direction. The CPU 101 stores the display preparation completed images in the preliminary storage area.

For example, when the upward scrolling is performed on the index display screen, new images appear from the bottom in the animation displayed on the display device 110. Namely, the hidden images disposed on the lower line are newly displayed.

Therefore, if the visible storage area is filled with the display preparation completed images, additional images are stored in the lower preliminary storage area. Namely, the CPU 101 prioritizes the lower preliminary storage area over the upper preliminary storage area.

On the contrary, if the downward scrolling is performed on the index display screen, additional images are stored in the upper preliminary storage area. Namely, the CPU 101 prioritizes the upper preliminary storage area over the lower preliminary storage area.

Thus, the display control apparatus according to the present exemplary embodiment can smoothly display images without interruption immediately after the scrolling is started.

In the present exemplary embodiment, the size of each preliminary storage area is set to be a half of the visible storage area. However, the size of each preliminary storage area can be arbitrarily determined according to a momentary state of the system memory.

In the present exemplary embodiment, it is useful that the display control apparatus enables users to simultaneously switch a plurality of images displayed on the index display screen without using the scrolling.

For example, the display control apparatus is functionally operable to replace all of the images disposed in an upper area ranging from the first line to the sixth line of the index display screen by the images disposed in a lower area ranging from the seventh line to the twelfth line without performing the scrolling.

In this case, the display preparation processing for images to be displayed can be performed in any order that may be different from the above-described order designated when the scrolling is performed on the index display screen.

For example, when the switching of images not using the scrolling is performed, it is useful to prioritize the display preparation processing for an image positioned closely to the images having been displayed before switching because users can easily recognize the direction along which the switching of images is successively performed.

For example, in the case where the images disposed in the upper area ranging from the first line to the sixth line of the index display screen are replaced by the images disposed in the lower area ranging from the seventh line to the twelfth line without performing the scrolling, it is useful to prioritize the display preparation processing for the seventh line.

Further, when the images disposed in the area ranging from the first line to the sixth line are replaced by images disposed in a hidden area ranging from the −5th line to the 0th line, it is useful to prioritize the display preparation processing for the 0th line.

On the other hand, even when the switching of a plurality of images displayed on the index display is performed without performing the scrolling, it may also be useful to prioritize the display preparation processing for an image positioned farther from the images having been displayed before switching because users can immediately recognize the destination of the switching of images and can determine whether to further perform switching of images.

Further, the number of images displayable on the index display screen is not limited to the above-described example. It may be useful to switch the number of simultaneously displayable images.

For example, according to the examples illustrated in FIGS. 2 to 4, an image group composed of six lines and seven columns is displayable on the index display screen. However, the display control apparatus can switch the number of simultaneously displayable images to an image group composed of three lines and three columns or an image group composed of ten lines and ten columns.

When the number of simultaneously displayable images is switched to a different image group, the display preparation processing for images to be displayed can be performed in any order that may be different from the above-described order designated when the scrolling is performed on the index display screen.

For example, when the number of displayable images is switched, it is useful to prioritize the display preparation processing for an image positioned closely to the images having been previously selected because users can easily recognize the images having been previously selected even after the above-described switching is performed.

Further, the present invention is not limited to the above-described specific exemplary embodiments and can be modified in various ways without departing from the spirit of the present invention.

Further, each of the above-described exemplary embodiments is a mere example of the present invention. The above-described exemplary embodiments can be appropriately combined. The CPU 101 performs the above-described processing described in each flowchart. However, a plurality of hardware modules may be used to cooperatively perform similar processing.

Further, the digital camera described in the above-described exemplary embodiments is an example of the display control apparatus according to the present invention. For example, the display control apparatus according to the present invention is not limited to the above-described example. More specifically, the present invention is applicable to any other display control apparatus enabling users to scroll a plurality of images on a screen, such as a personal computer, a Personal Digital Assistant (PDA), a portable telephone, a portable image viewer, a display device equipped printing apparatus, a digital photo frame, a game machine, or a music player.

OTHER EMBODIMENTS

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus for controlling a display device to display a plurality of images arranged in a matrix pattern on a screen of the display device comprising:
    a processor;
    a memory storing a program which, when executed by the processor, causes the information processing apparatus to:
    detect an instruction of scroll being input;
    select images arranged in lines in a range corresponding to the screen in accordance with the detected instruction of scroll; and
    perform a scroll display process based on a direction of the detected instruction of scroll, to display the selected images in accordance with a different order of priority rule depending on the direction of the detected instruction of scroll,
    wherein the scroll display process is performed based on the direction of the detected instruction of scroll such that first images arranged in a first line are selected after second images arranged in a second line lower than the first line are selected and at least one of the first images arranged in the first line is displayed prior to a second image which is arranged in the second line and has not been displayed on the screen, while the displayed image or images move downward on the screen by scroll, and
    wherein the scroll display process is performed based on the direction of the detected instruction of scroll such that third images arranged in a third line are selected after fourth images arranged in a fourth line upper than the third line are selected and at least one of the third images arranged in the third line is displayed prior to a fourth image which is arranged in the fourth line and has not been displayed on the screen, while the displayed image or images move upward on the screen by scroll.

2. The apparatus according to claim 1, wherein the program when executed by the processor further causes the apparatus to
    read an image from a storage medium;
    decode the image read from the storage medium,
    resize the decoded image,
    store the resized image in a buffer memory, and
    copy the stored image, which is selected according to the detected instruction of scroll, from the buffer memory into a memory area,
    wherein the image copied into the memory area is displayed on the screen.

3. The apparatus according to claim 1, wherein the scroll display process is performed by displaying the selected images arranged in the same line in order corresponding to the direction of the detected instruction of scroll.

4. The apparatus according to claim 1, wherein the first line is an upper edge line among the lines in which the selected images are arranged, while the displayed image or images move downward on the screen by scroll and wherein the third line is a lower edge line among the lines in which the selected images are arranged, while the displayed image or images move upward on the screen by scroll.

5. The apparatus according to claim 1,
    wherein the scroll display process is performed based on the direction of the detected instruction of scroll such that fifth images arranged in a fifth line upper than the first line and the second line are selected after the first images and the second images are selected and at least one of the fifth images arranged in the fifth line is displayed prior to the first images arranged in the first line and the second images arranged in the second line which have not been displayed on the screen, while the displayed image or images move downward on the screen by scroll, and
    wherein the scroll display process is performed based on the direction of the detected instruction of scroll such that sixth images arranged in a sixth line lower than the third line and the fourth line are selected after the third images and the fourth images are selected and at least one of the sixth images arranged in the sixth line is displayed prior to the third images arranged in the third line and the fourth images arranged in the fourth line which have not been displayed on the screen, while the displayed image or images move upward on the screen by scroll.

6. The apparatus according to claim 1,
wherein the scroll display process is performed by displaying the selected image arranged in a line which is one line lower than the first line immediately after all of the first images arranged in the first line are displayed if images arranged in a line which is upper than the first line is not selected when all of the first images arranged in the first line are displayed on the screen, while the displayed image or images move downward on the screen by scroll, and
wherein the scroll display process is performed by displaying the selected image arranged in a line which is one line upper than the third line immediately after all of the third images arranged in the third line are displayed if images arranged in a line which is lower than the third line is not selected when all of the third images arranged in the third line are displayed on the screen, while the displayed image or images move upward on the screen by scroll.

7. The apparatus according to claim 1,
wherein the scroll display process is performed by displaying the second image arranged in the second line after all of the first images are displayed on the screen, while the displayed image or images move downward on the screen by scroll, and
wherein the scroll display process is performed by displaying the fourth image arranged in the fourth line after all of the third images are displayed on the screen, while the displayed image or images move upward on the screen by scroll.

8. The apparatus according to claim 1,
wherein the instruction of scroll is input by a user's operation, and
wherein the displayed image or images move in speed based on the user's operation.

9. The apparatus according to claim 8, wherein the user's operation is accepted by a touch panel and the instruction of scroll is based on a position where the touch panel is touched by the user.

10. The apparatus according to claim 1,
wherein the program when executed by the processor further causes the apparatus to generate an image by using a photographing lens, an image sensor and A/D converter, and
wherein the generated image is arranged in the matrix pattern and displayed on the screen.

11. The apparatus according to claim 1, wherein the apparatus is a digital camera, a personal computer, a personal digital assistant, a portable telephone, an image viewer, a printing apparatus, a digital photo frame, a game machine or a music player.

12. The apparatus according to claim 1, wherein the lines in which the selected images are arranged are determined as target lines for performing scroll display process in accordance with the detected instruction of scroll, and the target lines are updated in accordance with the detected instruction of scroll.

13. A method for controlling a display device to display a plurality of images arranged in a matrix pattern on a screen comprising:
detecting an instruction of scroll being input;
selecting images arranged in lines in a range corresponding to the screen in accordance with to the detected instruction of scroll; and
performing a scroll display process based on a direction of the detected instruction of scroll, to display the selected images in accordance with a different order of priority rule depending on the direction of the detected instruction of scroll,
wherein the scroll display process is performed based on the direction of the detected instruction of scroll such that first images arranged in a first line are selected after second images arranged in a second line lower than the first line are selected and at least one of the first images arranged in the first line is displayed prior to a second image which is arranged in the second line and has not been displayed on the screen, while the displayed image or images move downward on the screen by scroll, and
wherein the scroll display process is performed based on the direction of the detected instruction of scroll such that third images arranged in a third line are selected after fourth images arranged in a fourth line upper than the third line are selected and at least one of the third images arranged in the third line is displayed prior to a fourth image which is arranged in the fourth line and has not been displayed on the screen, while the displayed image or images move upward on the screen by scroll.

14. A non-transitory computer readable storage medium storing a computer-executable program of instructions for causing a computer to perform a method, for controlling a display device to display a plurality of images arranged in a matrix pattern on a screen, comprising:
detecting an instruction of scroll being input;
selecting images arranged in lines in a range corresponding to the screen in accordance with the detected instruction of scroll; and
performing a scroll display process based on a direction of the detected instruction of scroll, to display the selected images in accordance with a different order of priority rule depending on the direction of the detected instruction scroll,
wherein the scroll display process is performed based on the direction of the detected instruction of scroll such that first images arranged in a first line are selected after second images arranged in a second line lower than the first line are selected and at least one of the first images arranged in the first line prior to a second image which is arranged in the second line and has not been displayed on the screen, while the displayed image or images move downward on the screen by scroll, and
wherein the scroll display process is performed based on the direction of the detected instruction of scroll such that third images arranged in a third line are selected after fourth images arranged in a fourth line upper than the third line are selected and at least one of the third images arranged in the third line is displayed prior to a fourth image which is arranged in the fourth line and has not been displayed on the screen, while the displayed image or images move upward on the screen by scroll.

15. The non-transitory computer readable storage medium according to claim 14, further comprising:
reading an image from a storage medium;
decoding the image read from the storage medium;
resizing the decoded image;
storing the resized image in a buffer memory; and
copying the stored image, which is selected according to the detected instruction of scroll, from the buffer memory into a memory area, wherein the image copied into the memory area is displayed on the screen.

16. The non-transitory computer readable storage medium according to claim 14, wherein the scroll display process is performed by displaying the selected images arranged in the same line in order corresponding to the direction of the detected instruction of scroll.

17. The non-transitory computer readable storage medium according to claim 14,
wherein the first line is an upper edge line among the lines in which the selected images are arranged while the displayed image or images move downward on the screen by scroll, and
wherein the third line is a lower edge line among the lines in which the selected images are arranged while the displayed image or images move upward on the screen by scroll.

18. The non-transitory computer readable storage medium according to claim 14,
wherein the scroll display process is performed based on the direction of the detected instruction of scroll such that fifth images arranged in a fifth line upper than the first line and the second line are selected after the first images and the second images are selected and at least one of the fifth images arranged in the fifth line is displayed prior to the first images arranged in the first line and the second images arranged in the second line which have not been displayed on the screen, while the displayed image or images move downward on the screen by scroll,
wherein the scroll display process is performed based on the direction of the detected instruction of scroll such that sixth images arranged in a sixth line lower than the third line and the fourth line are selected after the third images and the fourth images are selected and at least one of the sixth images arranged in the sixth line is displayed prior to the third images arranged in the third line and the fourth images arranged in the fourth line which have not been displayed on the screen, while the displayed image or images move upward on the screen by scroll, and
wherein a direction of the first line, a direction of the second line, a direction of the third line and a direction of the fourth line cross the direction of moving the images by scroll based on the detected instruction of scroll.

19. The non-transitory computer readable storage medium according to claim 14,
wherein the scroll display process is performed by displaying the selected image arranged in a line which is one line lower than the first line immediately after all of the first images arranged in the first line are displayed if images arranged in a line which is upper than the first line is not selected when all of the first images arranged in the first line are displayed on the screen, while the displayed image or images move downward on the screen by scroll, and
wherein the scroll display process is performed by displaying the selected image arranged in a line which is one line upper than the third line immediately after all of the third images arranged in the third line are displayed if images arranged in a line which is lower than the third line is not selected when all of the third images arranged in the third line are displayed on the screen, while the displayed image or images move upward on the screen by scroll.

20. The non-transitory computer readable storage medium according to claim 14,
wherein the scroll display process is performed by displaying the second image arranged in the second line after all of the first images are displayed on the screen, while the displayed image or images move downward on the screen by scroll, and
wherein the scroll display process is performed by displaying the fourth image arranged in the fourth line after all of the third images are displayed on the screen, while the displayed image or images move upward on the screen by scroll.

21. The non-transitory computer readable storage medium according to claim 14,
wherein the instruction of scroll is input by a user's operation, and
wherein the displayed image or images move in speed based on the user's operation.

22. The non-transitory computer readable storage medium according to claim 21, wherein the user's operation is accepted by a touch panel and the instruction of scroll is based on a position where the touch panel is touched by the user.

23. The non-transitory computer readable storage medium according to claim 14,
wherein the program when executed further causes the computer to generate an image by using a photographing lens, an image sensor and A/D converter, and
wherein the generated image is arranged in the matrix pattern and displayed on the screen.

24. The non-transitory computer readable storage medium according to claim 14, wherein the computer is a digital camera, a personal computer, a personal digital assistant, a portable telephone, an image viewer, a printing apparatus, a digital photo frame, a game machine or a music player.

25. The non-transitory computer readable storage medium according to claim 14, wherein the lines in which the selected images are arranged are determined as target lines for performing scroll display process in accordance with the detected instruction of scroll, and the target lines are updated in accordance with the detected instruction of scroll.

26. An information processing apparatus for controlling a display device to display a plurality of images arranged in a matrix pattern on a screen of the display device comprising:
a processor;
a memory storing a program which, when executed by the processor, causes the information processing apparatus to
detect an instruction of scroll being input;
select images arranged in lines in a range corresponding to the screen in accordance with the detected instruction of scroll; and
perform a scroll display process based on a direction of the detected instruction of scroll, to display the selected images in accordance with a different order of priority rule depending on the direction of the detected instruction of scroll,
wherein the scroll display process is performed based on the direction of the detected instruction of scroll such that first images arranged in a first line are selected after second images arranged in a second line which is to the first line's left are selected and at least one of the first images arranged in the first line is displayed prior to a second image which is arranged in the second line and has not been displayed on the screen, while the displayed image or images move leftward on the screen by scroll, and wherein the scroll display process is performed based on the direction of the detected instruction of scroll such that third images arranged in a third line are selected after fourth images arranged in a fourth line which is to the third line's right are selected and at least one of the third images arranged in the third line is displayed prior to a fourth image which is arranged in the fourth line and has not been displayed on the screen, while the displayed image or images move rightward on the screen by scroll.

27. The apparatus according to claim 26, wherein the program when executed by the processor further causes the apparatus to
read an image from a storage medium;
decode the image read from the storage medium;
resize the decoded image;
store the resized image in a buffer memory; and
copy the stored image, which is selected according to the detected instruction of scroll, from the buffer memory into a memory area,
wherein the image copied into the memory area is displayed on the screen.

28. The apparatus according to claim 26, wherein the first line is a right edge line among the lines in which the selected images are arranged, while the displayed image or images move leftward on the screen by scroll and wherein the third line is a left edge line among the lines in which the selected images are arranged, while the displayed image or images move rightward on the screen by scroll.

29. The apparatus according to claim 26,
wherein the scroll display process is performed based on the direction of the detected instruction of scroll such that fifth images arranged in a fifth line which is to the first line's right are selected after the first images and the second images are selected and at least one of the fifth images arranged in the fifth line is displayed prior to the first images arranged in the first line and the second images arranged in the second line which have not been displayed on the screen, while the displayed image or images move leftward on the screen by scroll, and
wherein the scroll display process is performed based on the direction of the detected instruction of scroll such that sixth images arranged in a sixth line which is to the third line's left are selected after the third images and the fourth images are selected and at least one of the sixth images arranged in the sixth line is displayed prior to the third images arranged in the third line and the fourth images arranged in the fourth line which have not been displayed on the screen, while the displayed image or images move rightward on the screen by scroll.

30. The apparatus according to claim 26,
wherein the scroll display process is performed by displaying the selected image arranged in a line which is on the first line's immediate left immediately after all of the first images arranged in the first line are displayed if images arranged in a line which is on the first line's right is not selected when all of the first images arranged in the first line are displayed on the screen, while the displayed image or images move leftward on the screen by scroll, and
wherein the scroll display process is performed by displaying the selected image arranged in a line which is the third line's immediate right immediately after all of the third images arranged in the third line are displayed if images arranged in a line which is on the third line's left is not selected when all of the third images arranged in the third line are displayed on the screen, while the displayed image or images move rightward on the screen by scroll.

31. The apparatus according to claim 26,
wherein the scroll display process is performed by displaying the second image arranged in the second line after all of the first images are displayed on the screen, while the displayed image or images move leftward on the screen by scroll, and
wherein the scroll display process is performed by displaying the fourth image arranged in the fourth line after all of the third images are displayed on the screen, while the displayed image or images move rightward on the screen by scroll.

32. The apparatus according to claim 26,
wherein the instruction of scroll is input by a user's operation, and
wherein the displayed image or images move in speed based on the user's operation.

33. The apparatus according to claim 32, wherein the user's operation is accepted by a touch panel and the instruction of scroll is based on a position where the touch panel is touched by the user.

34. The apparatus according to claim 26,
wherein the program when executed by the processor further causes the apparatus to generate an image by using a photographing lens, an image sensor and A/D converter, and
wherein the generated image is arranged in the matrix pattern and displayed on the screen.

35. The apparatus according to claim 26, wherein the apparatus is a digital camera, a personal computer, a personal digital assistant, a portable telephone, an image viewer, a printing apparatus, a digital photo frame, a game machine or a music player.

36. The apparatus according to claim 26, wherein the lines in which the selected images are arranged are determined as target lines for performing scroll display process in accordance with the detected instruction of scroll, and the target lines are updated in accordance with the detected instruction of scroll.

37. A method for controlling a display device to display a plurality of images arranged in a matrix pattern on a screen of the display device comprising:
detecting an instruction of scroll being input;
selecting images arranged in lines in a range corresponding to the screen, according to the detected instruction of scroll; and
performing a scroll display process based on a direction of the detected instruction of scroll, to display the selected images in accordance with a different order of priority rule depending on the direction of the detected instruction of scroll,
wherein the scroll display process is performed based on the direction of the detected instruction of scroll such that first images arranged in a first line are selected after second images arranged in a second line which is to the first line's left are selected and at least one of the first images arranged in the first line is displayed prior to a second image which is arranged in the second line and has not been displayed on the screen, while the displayed image or images move leftward on the screen by scroll, and
wherein the scroll display process is performed based on the direction of the detected instruction of scroll such that third images arranged in a third line are selected after fourth images arranged in a fourth line which is to the third line's right are selected and at least one of the third images arranged in the third line is displayed prior to a fourth image which is arranged in the fourth line and has not been displayed on the screen, while the displayed image or images move rightward on the screen by scroll.

38. A non-transitory computer readable storage medium storing a computer-executable program of instructions for causing a computer to perform a method, for controlling a display device to display a plurality of images arranged in a matrix pattern on a screen of the display device, comprising:

detecting an instruction of scroll being input;

selecting images arranged in lines in a range corresponding to the screen according to the detected instruction of scroll; and performing a scroll display process based on a direction of the detected instruction of scroll, to display the selected images in accordance with a different order of priority rule depending on the direction of the detected instruction of scroll, wherein the scroll display process is performed based on the direction of the detected instruction of scroll such that first images arranged in a first line are selected after second images arranged in a second line which is to the first line's left are selected and at least one of the first images arranged in the first line is displayed prior to a second image which is arranged in the second line and has not been displayed on the screen, while the displayed image or images move leftward on the screen by scroll, and wherein the scroll display process is performed based on the direction of the detected instruction of scroll such that third images arranged in a third line are selected after fourth images arranged in a fourth line which is to the third line's right are selected and at least one of the third images arranged in the third line is displayed prior to a fourth image which is arranged in the fourth line and has not been displayed on the screen, while the displayed image or images move rightward on the screen by scroll.

39. The non-transitory computer readable storage medium according to claim 38, further comprising:

reading an image from a storage medium;

decoding the image read from the storage medium, resizing the decoded image, store the resized image in a buffer memory, and copying the stored image, which is selected according to the detected instruction of scroll, from the buffer memory into a memory area, wherein the image copied into the memory area is displayed on the screen.

40. The non-transitory computer readable storage medium according to claim 38, wherein the first line is a right edge line among the lines in which the selected images are arranged, while the displayed image or images move leftward on the screen by scroll, and wherein the third line is a left edge line among the lines in which the selected images are arranged, while the displayed image or images move rightward on the screen by scroll.

41. The non-transitory computer readable storage medium according to claim 38, wherein the scroll display process is performed based on the direction of the detected instruction of scroll such that fifth images arranged in a fifth line which is to the first line's right are selected after the first images and the second images are selected and at least one of the fifth images arranged in the fifth line is displayed prior to the first images arranged in the first line and the second images arranged in the second line which have not been displayed on the screen, while the displayed image or images move leftward on the screen by scroll, and wherein the scroll display process is performed based on the direction of the detected instruction of scroll such that sixth images arranged in a sixth line which is to the third line's left are selected after the third images and the fourth images are selected and at least one of the sixth images arranged in the sixth line is displayed prior to the third images arranged in the third line and the fourth images arranged in the fourth line which have not been displayed on the screen, while the displayed image or images move rightward on the screen by scroll.

42. The non-transitory computer readable storage medium according to claim 38, wherein the scroll display process is performed by displaying the selected image arranged in a line which is on the first line's immediate left immediately after all of the first images arranged in the first line are displayed if images arranged in a line which is on the first line's right is not selected when all of the first images arranged in the first line are displayed on the screen, while the displayed image or images move leftward on the screen by scroll, and wherein the scroll display process is performed by displaying the selected image arranged in a line which is the third line's immediate right immediately after all of the third images arranged in the third line are displayed if images arranged in a line which is on the third line's left is not selected when all of the third images arranged in the third line are displayed on the screen, while the displayed image or images move rightward on the screen by scroll.

43. The non-transitory computer readable storage medium according to claim 38, wherein the scroll display process is performed by displaying the second image arranged in the second line after all of the first images are displayed on the screen, while the displayed image or images move leftward on the screen by scroll, and wherein the scroll display process is performed by displaying the fourth image arranged in the fourth line after all of the third images are displayed on the screen, while the displayed image or images move rightward on the screen by scroll.

44. The non-transitory computer readable storage medium according to claim 38, wherein the instruction of scroll is input by a user's operation, and wherein the displayed image or images move in speed based on the user's operation.

45. The non-transitory computer readable storage medium according to claim 44, wherein the user's operation is accepted by a touch panel and the instruction of scroll is based on a position where the touch panel is touched by the user.

46. The non-transitory computer readable storage medium according to claim 38, further comprising:

generating an image by using a photographing lens, an image sensor and A/D converter, wherein the generated image is arranged in the matrix pattern and displayed on the screen.

47. The non-transitory computer readable storage medium according to claim 38, wherein the computer is a digital camera, a personal computer, a personal digital assistant, a portable telephone, an image viewer, a printing apparatus, a digital photo frame, a game machine or a music player.

48. The non-transitory computer readable storage medium according to claim 38, wherein the lines in which the selected images are arranged are determined as target lines for performing scroll display process in accordance with the detected instruction of scroll, and the target lines are updated in accordance with the detected instruction of scroll.

* * * * *